(12) United States Patent
Han et al.

(10) Patent No.: US 12,451,062 B2
(45) Date of Patent: Oct. 21, 2025

(54) PIXEL DRIVE CIRCUIT AND DRIVING METHOD THEREOF, AND DISPLAY PANEL

(71) Applicant: BOE Technology Group Co., Ltd., Beijing (CN)

(72) Inventors: Long Han, Beijing (CN); Yu Feng, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/763,182

(22) PCT Filed: Apr. 1, 2021

(86) PCT No.: PCT/CN2021/084804
§ 371 (c)(1),
(2) Date: Mar. 23, 2022

(87) PCT Pub. No.: WO2022/205260
PCT Pub. Date: Oct. 6, 2022

(65) Prior Publication Data
US 2024/0046880 A1  Feb. 8, 2024

(51) Int. Cl.
*G09G 3/3233* (2016.01)
*G09G 3/3258* (2016.01)
(Continued)

(52) U.S. Cl.
CPC ......... *G09G 3/3233* (2013.01); *G09G 3/3258* (2013.01); *G09G 3/3266* (2013.01);
(Continued)

(58) Field of Classification Search
None
See application file for complete search history.

(56) References Cited

U.S. PATENT DOCUMENTS 10,650,753 B2   5/2020   Yang et al.
10,896,646 B2   1/2021   Kim et al.
(Continued)

FOREIGN PATENT DOCUMENTS

CN   106504699 A   3/2017
CN   107274829 A   10/2017
(Continued)

OTHER PUBLICATIONS

Written Opinion of PCT/CN2021/084804 dated Dec. 13, 2021, (4p).
(Continued)

*Primary Examiner* — Amr A Awad
(74) *Attorney, Agent, or Firm* — Arch & Lake LLP

(57) ABSTRACT

The source, drain and gate of the drive transistor of the pixel drive circuit are respectively connected to the first node, the second node and the third node. The storage capacitor is connected to the third node. The first control unit is used for enabling a path between the second node and the fourth node in response to the first control signal. The second control unit is used for outputting the first power supply voltage to the first node in response to the light-emitting signal. The threshold compensation transistor is used for enabling a path between the second node and the third node in response to the second control signal. The material of the active region is a metal oxide semiconductor.

18 Claims, 19 Drawing Sheets

(51) Int. Cl.
*G09G 3/3266* (2016.01)
*H10K 59/131* (2023.01)

(52) U.S. Cl.
CPC ............ *G09G 2300/0819* (2013.01); *G09G 2300/0842* (2013.01); *H10K 59/131* (2023.02)

(56) References Cited

U.S. PATENT DOCUMENTS

| | | | |
|---|---|---|---|
| 2015/0144892 A1* | 5/2015 | Chang | H10K 59/1213 |
| | | | 257/40 |
| 2016/0300900 A1* | 10/2016 | Miyake | G09G 3/3233 |
| 2018/0182292 A1* | 6/2018 | Zhu | G09G 3/3233 |
| 2019/0172397 A1 | 6/2019 | Lee et al. | |
| 2019/0325826 A1 | 10/2019 | Yang et al. | |
| 2020/0211448 A1 | 7/2020 | Zhou | |
| 2020/0211473 A1 | 7/2020 | Kim et al. | |
| 2020/0211476 A1* | 7/2020 | Park | G09G 3/3291 |
| 2021/0134917 A1* | 5/2021 | Li | G09G 3/3266 |
| 2021/0343242 A1* | 11/2021 | Wang | G09G 3/3258 |
| 2021/0358407 A1* | 11/2021 | Xu | H10K 59/1216 |
| 2021/0375198 A1* | 12/2021 | Zhang | G09G 3/325 |
| 2022/0383811 A1* | 12/2022 | Liu | H10K 59/351 |
| 2022/0392403 A1* | 12/2022 | Yamamoto | G11C 19/28 |
| 2023/0107029 A1* | 4/2023 | Wang | G11C 19/28 |
| | | | 345/206 |
| 2023/0360599 A1* | 11/2023 | Liu | G09G 3/3233 |
| 2023/0368730 A1* | 11/2023 | Yamamoto | G09G 3/3275 |
| 2024/0087520 A1* | 3/2024 | Okada | G09G 3/3233 |

FOREIGN PATENT DOCUMENTS

| | | | | |
|---|---|---|---|---|
| CN | 108538248 A | | 9/2018 | |
| CN | 108806610 A | | 11/2018 | |
| CN | 108986742 A | | 12/2018 | |
| CN | 110767665 A | | 2/2019 | |
| CN | 109817165 A | | 5/2019 | |
| CN | 110729324 A | | 1/2020 | |
| CN | 111445851 A | * | 7/2020 | ........... G09G 3/3208 |
| CN | 111739471 A | | 10/2020 | |
| CN | 112071882 A | | 12/2020 | |
| CN | 109817165 B | | 4/2021 | |
| KR | 2020057530 A | | 5/2020 | |
| WO | 2020181968 A1 | | 9/2020 | |
| WO | WO-2021016946 A1 | * | 2/2021 | ........... G09G 3/3233 |
| WO | WO2021103604 A1 | | 6/2021 | |

OTHER PUBLICATIONS

The First CN Office Action issued in CN Application No. 202180000683.9 dated Oct. 23, 2024 with English Translation, (30p).

* cited by examiner

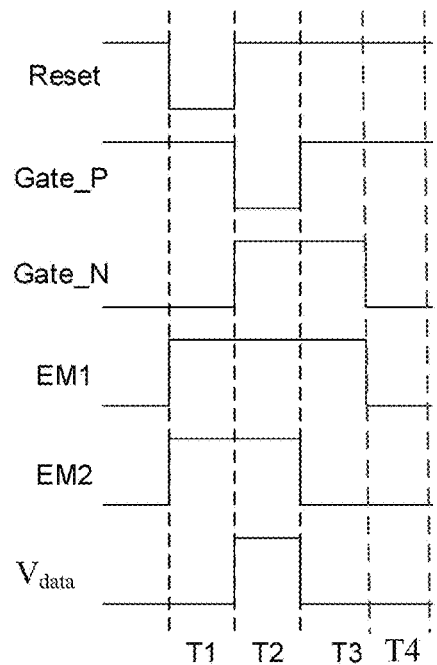

FIG.3 in a reset stage, applying the reset control signal to the reset unit to enable the reset unit to output the initialization voltage to the fourth node, applying the first control signal to the first control unit to enable a path between the second node and the fourth node, applying a second control signal to the threshold compensation transistor to enable a path between the second node and the third node, the drive transistor is turned on under control of the initialization voltage applied to the third node — S110 in a data writing stage, applying the third control signal and the data voltage to the data writing unit to output the data voltage to the first node, applying the second control signal to the threshold compensation transistor to enable a path between the second node and the third node, the drive transistor is turned off after the third node is written with the data voltage compensated by a threshold voltage of the drive transistor — S120 in a light-emitting stage, applying the light-emitting signal to the second control unit to apply the first power supply voltage to the first node, and applying the first control signal to the first control unit to enable a path between the second node and the fourth node — S130

FIG.4

PIXEL DRIVE CIRCUIT AND DRIVING METHOD THEREOF, AND DISPLAY PANEL

CROSS REFERENCE

The present application is a U.S. National Stage of International Application No. PCT/CN2021/084804, filed on Apr. 1, 2021, the contents of all of which are incorporated herein by reference in their entireties for all purposes.

TECHNICAL FIELD

The present disclosure relates to the field of display technology, and in particular, to a pixel drive circuit and a driving method thereof, and a display panel.

BACKGROUND

LTPS (low temperature polysilicon) transistors have advantages of high electron mobility and strong driving ability, and are widely used in display panels. However, the display panel fabricated by the LTPS process is prone to generating low frequency flickering problem under low gray scale display, which reduces the display quality.

SUMMARY

The present disclosure adopts the following technical solutions.

According to a first aspect of the present disclosure, there is provided a pixel drive circuit, including:
- a drive transistor, having a source connected to a first node, a drain connected to a second node, and a gate connected to a third node;
- a storage capacitor, having a first end connected to the third node, and a second end configured to apply a first power supply voltage or a second power supply voltage;
- a first control unit, connected to the second node and the fourth node, and configured to enable a path between the second node and the fourth node in response to a first control signal;
- a second control unit, connected to the first node, and configured to output the first power supply voltage to the first node in response to a light-emitting signal;
- a threshold compensation transistor, connected to the second node and the third node, and configured to enable a path between the second node and the third node in response to a second control signal, wherein a material of an active region of the threshold compensation transistor is a metal oxide semiconductor;
- a data writing unit, connected to the first node, and configured to output a data voltage to the first node in response to a third control signal;
- a reset unit, connected to the fourth node, and configured to output an initialization voltage to the fourth node in response to a reset control signal; and
- a light-emitting element, having a first end connected to the fourth node, and a second end configured to apply the second power supply voltage.

In an example embodiment of the present disclosure, a gate of the threshold compensation transistor includes a first gate and a second gate, and a channel region of the threshold compensation transistor is sandwiched between the first gate and the second gate, and the first gate and the second gate are configured to apply the second control signal simultaneously.

In an example embodiment of the present disclosure, the data writing unit includes a data writing transistor, the data writing transistor has a source configured to apply the data voltage, a drain connected to the first node, and a gate configured to apply the third control signal;
the first control unit includes a first control transistor, the first control transistor has a source connected to the second node, a drain connected to the fourth node, and a gate configured to apply the first control signal;
the second control unit includes a second control transistor, the second control transistor has a source configured to apply the first power supply voltage, a drain connected to the first node, and a gate configured to apply the light-emitting signal;
the reset unit includes a reset transistor, the reset transistor has a source configured to apply the initialization voltage, a drain connected to the fourth node, and a gate configured to apply the reset control signal.

In an example embodiment of the present disclosure, the drive transistor, the data writing transistor, the first control transistor, the second control transistor and the reset transistor are all P-type transistors, and active regions are all polysilicon; the threshold compensation transistor is an N-type transistor.

In an example embodiment of the present disclosure, the storage capacitor includes a first electrode plate, a second electrode plate, a third electrode plate and a fourth electrode plate that are stacked in sequence, and an insulating medium is sandwiched between any two adjacent electrode plates; the first electrode plate and the third electrode plate are both electrically connected to the third node; the second electrode plate and the fourth electrode plate are connected to each other and are configured to apply the first power supply voltage or the second power supply voltage.

According to a second aspect of the present disclosure, there is provided a method for driving a pixel drive circuit, configured to drive the above pixel drive circuits, the method for driving the pixel drive circuit includes:
- in a reset stage, applying the reset control signal to the reset unit to enable the reset unit to output the initialization voltage to the fourth node, applying the first control signal to the first control unit to enable a path between the second node and the fourth node, applying a second control signal to the threshold compensation transistor to enable a path between the second node and the third node, wherein the drive transistor is turned on under control of the initialization voltage applied to the third node;
- in a data writing stage, applying the third control signal and the data voltage to the data writing unit to output the data voltage to the first node, applying the second control signal to the threshold compensation transistor to enable a path between the second node and the third node, wherein the drive transistor is turned off after the third node is written with the data voltage compensated by a threshold voltage of the drive transistor;
- in a light-emitting stage, applying the light-emitting signal to the second control unit to apply the first power supply voltage to the first node, and applying the first control signal to the first control unit to enable a path between the second node and the fourth node.

According to a third aspect of the present disclosure, there is provided a display panel, including the above pixel drive circuits.

In an example embodiment of the present disclosure, the display panel includes a plurality of rows of the pixel drive circuits;

when the data writing unit includes a data writing transistor and the reset unit includes a reset transistor, in two adjacent rows of the pixel drive circuits, gates of the data writing transistors of the pixel drive circuits of a previous row are electrically connected with gates of the reset transistors of the pixel drive circuits of a next row.

In an example embodiment of the present disclosure, the display panel further includes a plurality of reset control leads in one-to-one correspondence with the plurality of rows of the pixel drive circuits; in the two adjacent rows of the pixel drive circuits, the gates of the data writing transistors of the pixel drive circuits of a previous row and the gates of the reset transistors of the pixel drive circuits of a next row are connected to an identical reset control lead.

In an example embodiment of the present disclosure, the display panel includes a plurality of rows of the pixel drive circuits;
when the first control unit includes the first control transistor, in two adjacent rows of the pixel drive circuits, gates of the first control transistors of the pixel drive circuits of a previous row are electrically connected with gates of the threshold compensation transistors of the pixel drive circuits of a next row.

In an example embodiment of the present disclosure, the display panel includes a plurality of first scan leads and a plurality of second scan leads arranged in one-to-one correspondence with the plurality of rows of the pixel drive circuits; the gates of the first control transistors of the pixel drive circuits of any row are electrically connected with a corresponding first scan lead, and the gates of the threshold compensation transistors of the pixel drive circuits of any row are electrically connected with a corresponding second scan lead;
wherein, in two adjacent rows of the pixel drive circuits, the first scan lead corresponding to the pixel drive circuits of the previous row is electrically connected with the second scan lead corresponding to the pixel drive circuits of the next row.

In an example embodiment of the present disclosure, when the gate of the threshold compensation transistor includes a first gate and a second gate, the display panel further includes a plurality of third scan leads arranged in one-to-one correspondence with the plurality of rows of the pixel drive circuits;
the first gates of the threshold compensation transistors of the pixel drive circuits of any row are electrically connected with the corresponding second scan lead, and the second gates of the threshold compensation transistors of the pixel drive circuits of any row are electrically connected with the corresponding third scan lead; the second scan lead and the third scan lead corresponding to the pixel drive circuits of any row are electrically connected.

In an example embodiment of the present disclosure, the display panel includes a base substrate, a drive circuit layer and a display device layer that are stacked in sequence; the drive circuit layer includes a a polysilicon semiconductor layer, a first gate insulating layer, a first gate layer, a first interlayer dielectric layer, a metal oxide semiconductor layer, a second gate insulating layer, a second gate layer, a second interlayer dielectric layer and a metal wiring layer that are stacked in sequence on the base substrate;
the first gate layer includes a fourth scan lead, a reset control lead, a first scan lead, a second scan lead, a light-emitting signal lead, and a first electrode plate of the storage capacitor; the first scan lead is configured to transmit the first control signal; the second scan lead is configured to transmit the second control signal; the fourth scan lead is configured to transmit the third control signal; the reset control lead is configured to transmit the reset control signal; and the light-emitting signal lead is configured to transmit the light-emitting signal;
the second gate layer includes a third scan lead configured to transmit the second control signal and a second electrode plate of the storage capacitor.

In an example embodiment of the present disclosure, the metal wiring layer includes a first metal wiring layer and a second metal wiring layer located on a side of the first metal wiring layer away from the base substrate;
a first electrode of the storage capacitor includes a first electrode plate located in the first gate layer and a third electrode plate located in the first metal wiring layer that are electrically connected with each other, and a second electrode of the storage capacitor includes a second electrode plate located in the second gate layer and a fourth electrode plate located in the second metal wiring layer that are electrically connected with each other;
orthographic projections of the first electrode plate, the second electrode plate, the third electrode plate and the fourth electrode plate on the base substrate have a common overlapping region.

In an example embodiment of the present disclosure, the display panel includes a plurality of pixel circuit regions arranged in an identical row; the two second electrode plates in the two adjacent pixel circuit regions arranged in an identical row are connected with each other.

In an example embodiment of the present disclosure, in an identical pixel circuit region, the first electrode plate has a first protrusion extending toward a side close to the drain of the threshold compensation transistor, the third electrode plate has a second protrusion extending toward the side close to the drain of the threshold compensation transistor; the first protrusion and the second protrusion are connected through a via hole.

In an example embodiment of the present disclosure, an orthographic projection of an active region of the threshold compensation transistor on the base substrate is located within the orthographic projection of the fourth electrode plate on the base substrate.

In an example embodiment of the present disclosure, the display panel includes a plurality of first leads and a plurality of first shift registers cascaded in sequence; each of the first leads extends in a row direction and is connected to an output end of each of the first shift registers in one-to-one correspondence;
the number of the pixel drive circuits is multiple and the plurality of the pixel drive circuits are arranged in a plurality of rows; the pixel drive circuits of any two adjacent rows are electrically connected with an identical first lead, and any two adjacent first leads are electrically connected with the pixel drive circuits in an identical row;
wherein, in the pixel drive circuits of two adjacent rows, the first lead is used as the fourth scan lead to apply the third control signal to the pixel drive circuits of a previous row, and used as the reset control lead to apply the reset control signal to the pixel drive circuits of a next row.

In an example embodiment of the present disclosure, the number of the pixel drive circuits is multiple and the plurality of the pixel drive circuits are arranged in plurality of rows; the number of the first scan leads is multiple and all the first scan leads extend along a row direction, and the plurality of the first scan leads are electrically connected with the plurality of rows of the pixel drive circuits in one-to-one correspondence; the number of the second scan leads is multiple and all the second scan leads extend along the row direction, and the plurality of the second scan leads are electrically connected with the plurality of rows of the pixel drive circuits in one-to-one correspondence; the number of the third scan leads is multiple and all the third scan leads extend along the row direction, and the plurality of the third scan leads are electrically connected with the plurality of rows of the pixel drive circuits in one-to-one correspondence;

the display panel further includes a plurality of second shift registers cascaded in sequence;

wherein, in the pixel drive circuits of any two adjacent rows, the second scan lead and the third scan lead connected to the pixel drive circuits of the next row, and the first scan lead connected to the pixel driving circuits of the previous row are connected to an output end of an identical second shift register unit;

in the first scan lead, the second scan lead and the third scan lead connected to the pixel driving circuits of any row, the first scan lead and the second scan lead are respectively connected to output ends of two adjacent second shift register units, the second scan lead and the third scan lead are connected to the output end of an identical second shift register.

Other features and advantages of the present disclosure will become apparent from the following detailed description, or be learned in part by practice of the present disclosure.

It is to be understood that the foregoing general description and the following detailed description are exemplary and explanatory only and are not restrictive of the present disclosure.

BRIEF DESCRIPTION OF THE DRAWINGS

The drawings herein are incorporated into the specification and constitute a part of the specification, show embodiments in accordance with the disclosure, and explain the principle of the disclosure together with the specification. The drawings in the following description are only some embodiments of the present disclosure. For those of ordinary skill in the art, other drawings can be obtained based on these drawings without creative work.

FIG. 3 is a timing diagram of a pixel drive circuit in an embodiment of the disclosure.

FIG. 4 is a schematic flowchart of a driving method of a pixel drive circuit in an embodiment of the disclosure.

in FIG. 18, the cut position in FIG. 19 is marked by a dotted line PQ.

Figure 1:
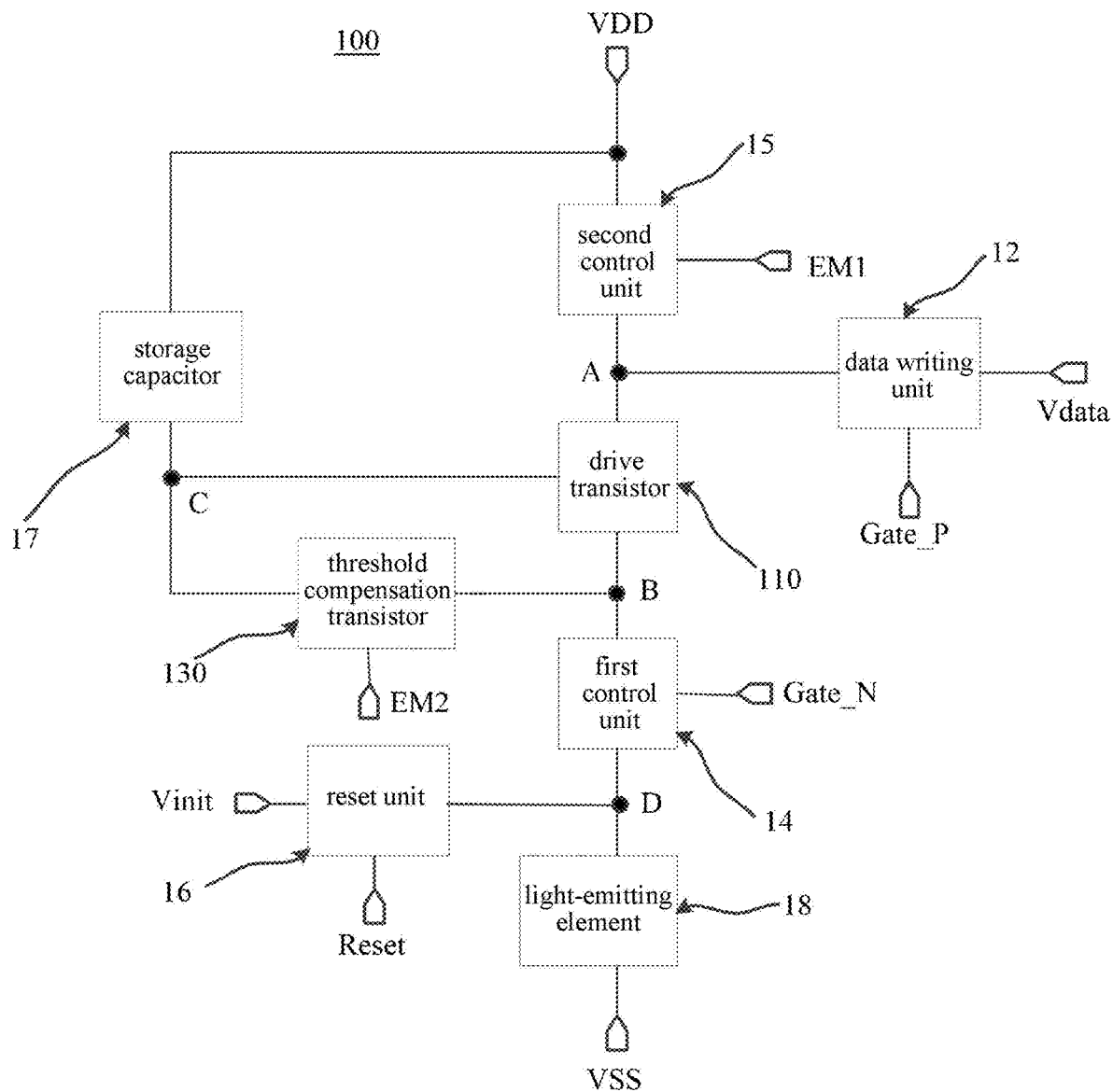
FIG. 1 is a schematic diagram of a pixel drive circuit in an embodiment of the disclosure.

The reference numerals of main components in the figure are described as follows:

110, drive transistor; 111, gate of drive transistor; 112, channel region of the drive transistor; 12, data writing unit; 120, data writing transistor; 121, gate of the data writing transistor; 122, channel region of the data writing transistor; 130, threshold compensation transistor; 131, gate of the threshold compensation transistor; 1311, first gate; 1312, second gate; 132, channel region of the threshold compensation transistor; 14, first control unit; 140, first control transistor; 141, gate of the first control transistor; 142, channel region of the first control transistor; 15, second control unit; 150, second control transistor; 151, gate of the second control transistor; 152, channel region of the second control transistor; 16, reset unit; 160, reset transistor; 161, gate of the reset transistor; 162, channel region of the reset transistor; 17, storage capacitor; 171, first electrode plate; 1711, first protrusion; 172, second electrode plate; 1721, third protrusion; 173, third electrode plate; 1731, second protrusion; 174, fourth electrode plate; 18, light-emitting element; VDD, first power supply voltage; VSS, second power supply voltage; Gate_N, first control signal; EM2, second control signal;

Gate_P, third control signal; EM1, light-emitting signal; $V_{init}$, initialization voltage; Reset, reset control signal; $V_{data}$, data voltage; 201, base substrate; 2011, first polyimide layer; 2012, first shielding layer; 2013, second polyimide layer; 2014, second shielding layer; 202, drive circuit layer; 2021, first buffer layer; 2022, second buffer layer; 203, display device layer; 310, polysilicon semiconductor layer; 320, first gate insulating layer; 330, first gate layer; 340, first interlayer dielectric layer; 350, metal oxide semiconductor layer; 360, second gate insulating layer; 370, second gate layer; 380, second interlayer dielectric layer; 390, metal wiring layer; 391, first metal wiring layer; 392, first planarization layer; 393, second metal wiring layer; 394, second planarization layer; 395, passivation layer; 401, first scan lead; 402, second scan lead; 403, third scan lead; 404, fourth scan lead; 405, data voltage lead; 406, first power supply voltage lead; 407, reset control lead; 408, initialization signal lead; 409, light-emitting signal lead; 510, first connection lead 520, second connection lead; 521, first conductive segment; 522, second conductive segment; 523, third conductive segment; 530, third connection lead; 540, fourth connection lead; 550, fifth connection lead; 560, sixth connection lead; 570, seventh connection lead; 610, first metal wiring; 620, second metal wiring; 624, fourth conductive segment; 625, fifth conductive segment; 626, sixth conductive segment; 630, third metal wiring; 640, fourth metal wiring; 647, seventh conductive segment; 648, eighth conductive segment; 650, fifth metal wiring; 700, pixel circuit region; 701, first protruding region; 702, second protruding region; 801, first active via region; 802, second active via region; 803, third active via region; 804, fourth active via region; 805, fifth active via region; 806, sixth active via region; 807, seventh gate via region; 810, tenth gate via region; 811, eleventh bottom via region; 812, twelfth bottom via region; 813, thirteenth bottom via region; 901, first wiring via region; 902, second wiring via region; 903, third wiring via region; 904, fourth wiring via region; 905, fifth wiring via region; 906, sixth wiring via region; 907, seventh wiring via region; 908, eighth wiring via region; 909, ninth wiring via region; 910, tenth wiring via region; 911, eleventh top via region; 912, twelfth top via region; 913, thirteenth top via region; A, first node; B, second node; C, third node; D, fourth node; E, row direction; E1, first direction; E2, second direction; F, column direction; F3, third direction; F4, fourth direction.

DETAILED DESCRIPTION

Example embodiments will now be described more fully with reference to the accompanying drawings. Example embodiments, however, can be embodied in various forms and should not be construed as limited to the embodiments set forth herein; rather, these embodiments are provided so that this disclosure will be thorough and complete, and will fully convey the concept of example embodiments to those skilled in the art. The described features, structures, or characteristics may be combined in any suitable manner in one or more embodiments. In the following description, numerous specific details are provided in order to give a thorough understanding of the embodiments of the present disclosure. However, those skilled in the art will appreciate that the technical solutions of the present disclosure may be practiced without one or more of the specific details, or other methods, components, devices, steps, etc. may be employed. In other instances, well-known solutions have not been shown or described in detail to avoid obscuring aspects of the present disclosure.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily necessarily correspond to physically or logically separate entities. These functional entities may be implemented in software, or in one or more hardware modules or integrated circuits, or in different networks and/or processor devices and/or microcontroller devices.

The terms "a", "an", "the" and "said" are used to indicate the presence of one or more elements/components/etc.; the terms "including" and "having" are used to indicate open-ended inclusive meaning and means that additional elements/components/etc. may be present in addition to the listed elements/components/etc.; the terms "first" and "second" or the like are used only as labels, not to limit the number of the objects.

The present disclosure provides a pixel drive circuit. Referring to FIG. 1, the pixel drive circuit 100 may include a drive transistor 110, a storage capacitor 17, a first control unit 14, a second control unit 15, a threshold compensation transistor 130, a data writing unit 12, a reset unit 16 and a light-emitting element 18.

The source of the drive transistor 110 is connected to the first node A, the drain of the drive transistor 110 is connected to the second node B, and the gate 111 of the drive transistor is connected to the third node C.

The first end of the storage capacitor 17 is connected to the third node C, and the second end of the storage capacitor 17 is used to apply a first power supply voltage VDD or a second power supply voltage VSS.

The first control unit 14 is connected to the second node B and the fourth node D, and is used for enabling a path between the second node B and the fourth node D in response to the first control signal Gate_N.

The second control unit 15 is connected to the first node A, and used for outputting the first power supply voltage VDD to the first node A in response to the light-emitting signal EM1.

The threshold compensation transistor 130 is connected to the second node B and the third node C, and is used for enabling a path between the second node B and the third node C in response to the second control signal EM2. The material of the active region of the threshold compensation transistor 130 is a metal oxide semiconductor.

The data writing unit 12 is connected to the first node A, and used for outputting the data voltage $V_{data}$ to the first node A in response to the third control signal Gate_P.

The reset unit 16 is connected to the fourth node D, and is used for outputting the initialization voltage $V_{init}$ to the fourth node D in response to the reset control signal Reset.

The first end of the light-emitting element 18 is connected to the fourth node D, and the second end thereof is used for applying the second power supply voltage VSS.

In the pixel drive circuit provided by the present disclosure, there is only one leakage path of the threshold compensation transistor 130 at the third node C, which can reduce the number of leakage paths of the third node C and facilitate the voltage hold of the third node C. The material of the active region of the threshold compensation transistor 130 between the third node C and the second node B is a metal oxide semiconductor. Since the metal oxide semiconductor has a smaller leakage current, the current leakage from the third node C to the second node B can be reduced, and the third node C can achieve more efficient voltage hold, which avoids the problem of low frequency flickering under the low gray scale display. In addition, the leakage current of the threshold compensation transistor 130 is small and the leakage path of the third node C is small, which can reduce the power consumption of the pixel drive circuit. Not only that, since the third node C can achieve longer voltage hold, the refresh frequency of the third node C can be reduced, the pixel drive circuit can be applied to a display panel with a lower refresh frequency, which reduces the power consumption of the display panel.

Hereinafter, the structure, principle, working process and effect of the pixel drive circuit provided by the present disclosure will be further explained and described with reference to the accompanying drawings.

In the pixel drive circuit provided by the present disclosure, the threshold compensation transistor 130 may be a metal oxide thin film transistor, so as to reduce the leakage current of the pixel drive circuit from the third node C to the second node B. The material of the active layer of the threshold compensation transistor 130 may include a metal oxide semiconductor, such as IGZO (Indium Gallium Zinc Oxide), IZO (Indium Zinc Oxide), and the like. The active layer of the threshold compensation transistor 130 may include a source, a channel region and a drain which are connected in sequence. The channel region may maintain P-type semiconductor characteristics, and the source and the drain may be conductorized. For example, the source and the drain may be annealed in an atmosphere containing hydrogen, such that the metal oxide semiconductors of the source and the drain are doped with hydrogen to increase the conductivity.

Figure 18:
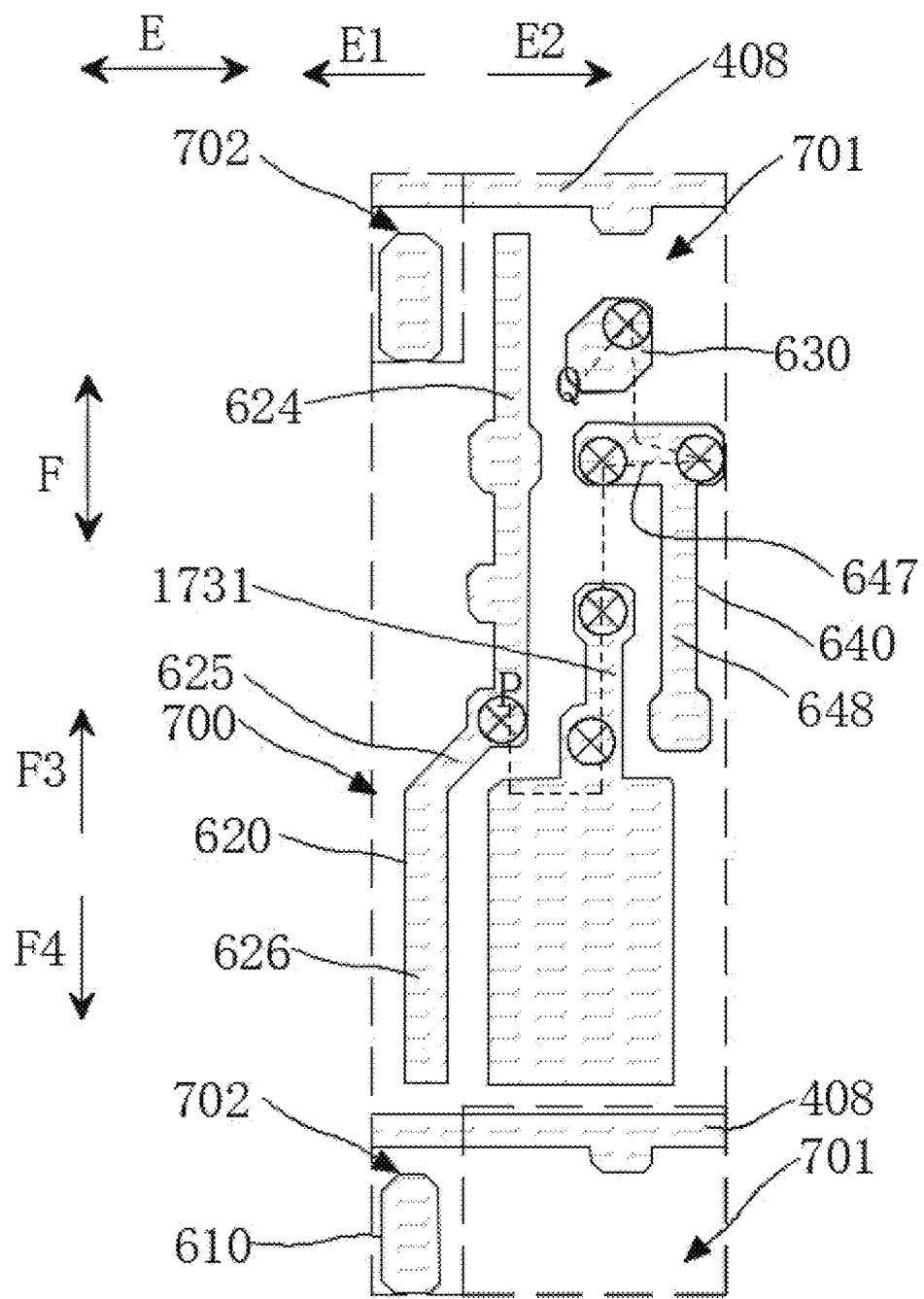
FIG. 18 is a schematic structural diagram of a first metal wiring layer in a pixel circuit region in an embodiment of the disclosure.
Figure 19:
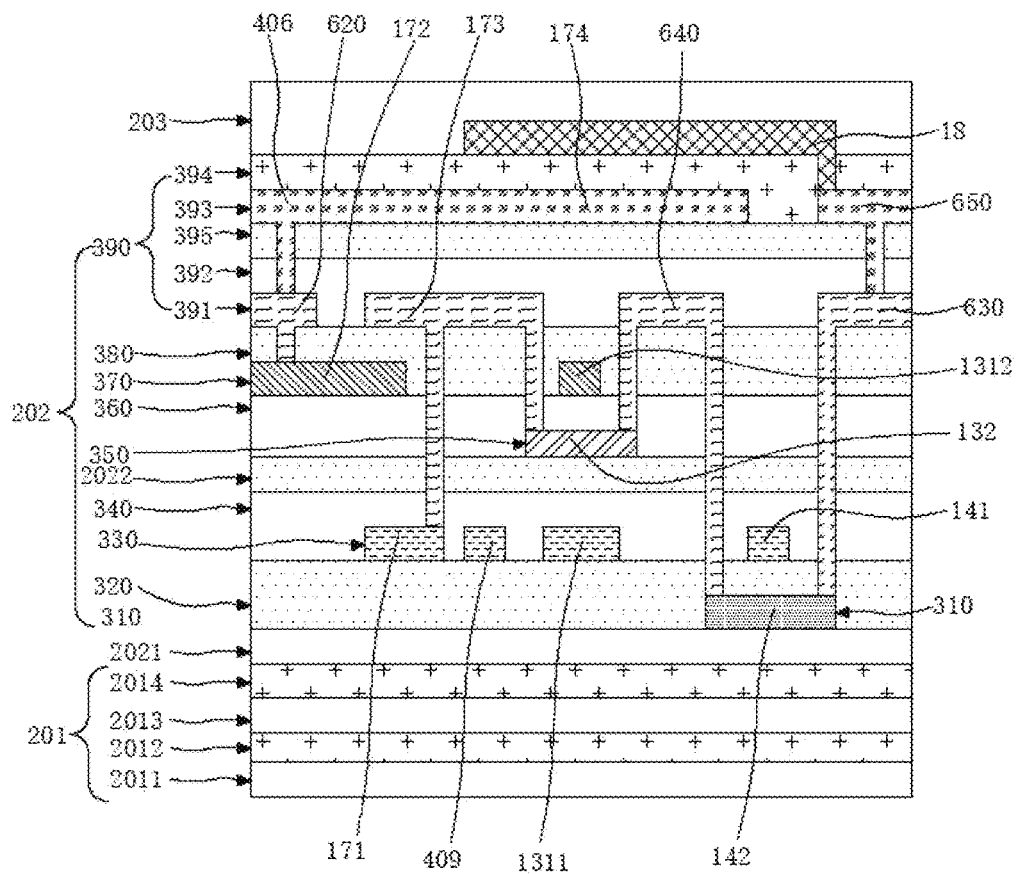
FIG. 19 is a schematic diagram of a hierarchical structure of a display panel according to an embodiment of the disclosure cut along the dotted line PQ in FIG. 18.

FIG. 19 is a schematic cross-sectional view at the position of the dotted line of PQ in FIG. 18. Further, referring to FIG. 19, the gate of the threshold compensation transistor 130 includes a first gate 1311 and a second gate 1312, and the channel region 132 of the threshold compensation transistor is sandwiched between the first gate 1311 and the second gate 1312. The first gate 1311 and the second gate 1312 are used to simultaneously apply the second control signal EM2. In this way, when the first gate 1311 and the second gate 1312 of the threshold compensation transistor 130 are simultaneously applied with the second control signal EM2, the threshold compensation transistor 130 can be fully turned on. When the first gate 1311 and the second gate 1312 of the threshold compensation transistor 130 are applied with a control signal for turning off the threshold compensation transistor 130, for example, when the first gate 1311 and the second gate 1312 of the N-type threshold compensation transistor 130 are simultaneously applied with a low level control signal, the influence of the floating body effect can be eliminated to ensure that the threshold compensation transistor 130 is turned off more fully, and further reduce the leakage current of the threshold compensation transistor 130 in the off state. In this way, the leakage current of the pixel drive circuit from the third node C to the second node B is smaller, and the voltage holding capability of the third node C is stronger, which can further enhance the ability of the pixel drive circuit to be suitable for low frequency driving and further improve the low frequency flickering problem under the low gray scale and further reduce the power consumption of the pixel drive circuit.

Figure 2:
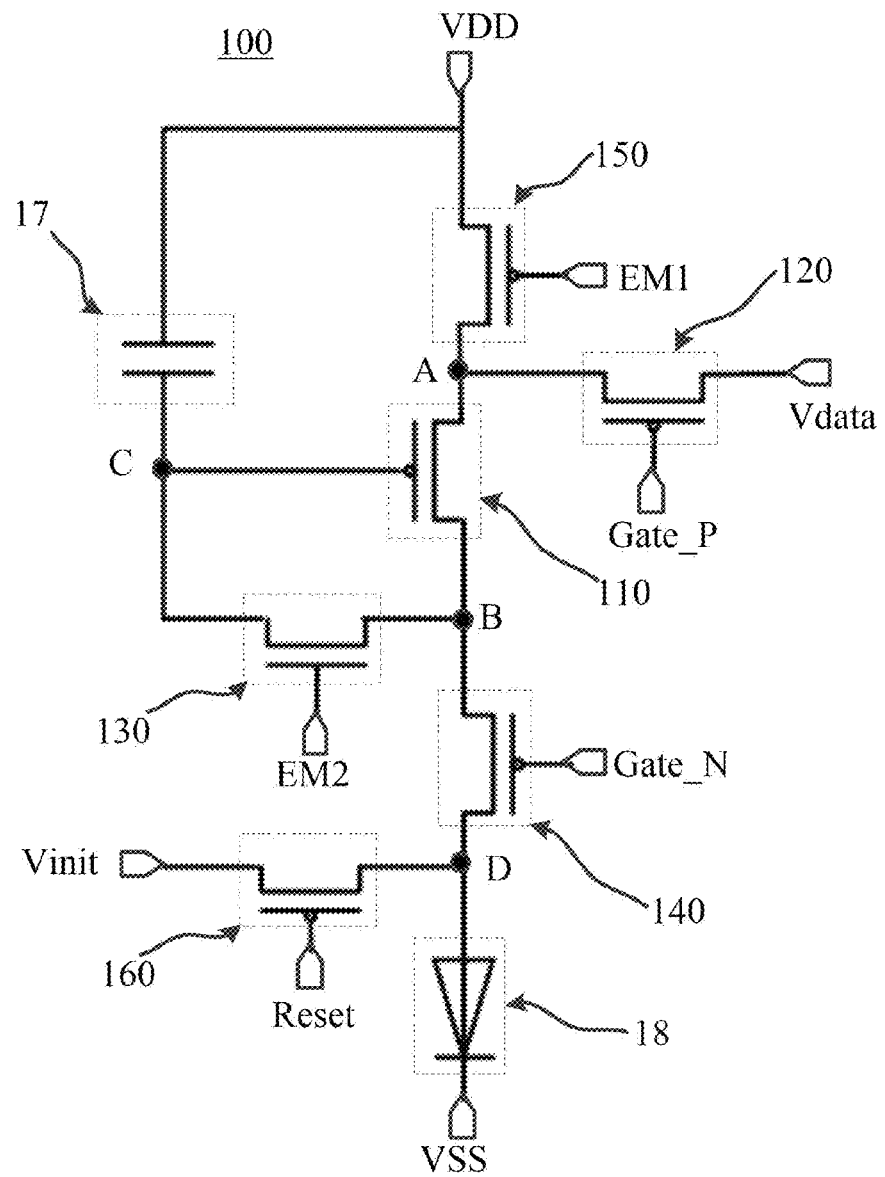
FIG. 2 is a schematic diagram of a pixel drive circuit in an embodiment of the disclosure.

Optionally, referring to FIG. 2, the data writing unit 12 includes a data writing transistor 120. The source of the data writing transistor 120 is used to apply the data voltage $V_{data}$, the drain of the data writing transistor 120 is connected to the first node A, and the gate 121 of the data writing transistor 120 is used to apply the third control signal Gate_P.

Optionally, the first control unit 14 includes a first control transistor 140. The source of the first control transistor 140 is connected to the second node B, the drain of the first control transistor 140 is connected to the fourth node D, and the gate 141 of the first control transistor 140 is used to apply the first control signal Gate_N.

Optionally, the second control unit 15 includes a second control transistor 150. The source of the second control transistor 150 is used to apply the first power supply voltage VDD, the drain of the second control transistor 150 is connected to the first node A, and the gate 151 of the second control transistor is used to apply the light-emitting signal EM1.

Optionally, the reset unit 16 includes a reset transistor 160. The source of the reset transistor 160 is used to apply the initialization voltage $V_{init}$, the drain of the reset transistor 160 is connected to the fourth node D, and the gate 161 of the reset transistor is used to apply the reset control signal Reset.

Optionally, the drive transistor 110, the data writing transistor 120, the first control transistor 140, the second control transistor 150 and the reset transistor 160 are all P-type transistors, and the active regions are all polysilicon. The threshold compensation transistor 130 is a N-type transistor.

Preferably, each transistor is a thin film transistor.

Optionally, referring to FIG. 19, the storage capacitor 17 includes a first electrode plate 171, a second electrode plate 172, a third electrode plate 173 and a fourth electrode plate 174 that are stacked in sequence, and an insulating medium is sandwiched between any two adjacent electrode plates. The first electrode plate 171 and the third electrode plate 173 are both electrically connected to the third node C. The second electrode plate 172 and the fourth electrode plate 174 are connected to each other and are used for applying the first power supply voltage VDD or the second power supply voltage VSS. In this way, the capacitance of the storage capacitor 17 can be increased, the influence of the leakage of the third node C on the voltage of the third node C can be reduced, the voltage hold capability of the third node C can be improved, and the ability of the pixel drive circuit to be suitable for low frequency driving is further enhanced, and the problem of low frequency flickering under the low gray scale is further improved.

Optionally, the light-emitting element 18 can be an OLED (organic electroluminescent diode), a PLED (polymer organic electroluminescent diode), a QD-OLED (quantum dot-organic light emitting diode), a micro LED (micro light emitting diode) or other types of current-driven light-emitting elements 18. Preferably, the light-emitting element 18 may be an OLED.

The present disclosure also provides a method for driving a pixel drive circuit, which is used for driving any pixel drive circuit described in the above-mentioned pixel drive circuit embodiments. Referring to FIG. 4, the method for driving the pixel drive circuit includes the methods shown in steps S110 to S130.

Step S110, referring to FIG. 3, in a reset stage T1, the reset control signal Reset is applied to the reset unit 16 to enable the reset unit 16 to output the initialization voltage Vinit to the fourth node D. The first control signal Gate_N is applied to the first control unit 14 to enable a path between the second node B and the fourth node D. A second control signal EM2 is applied to the threshold compensation transistor 130 to enable a path between the second node B and the third node C. The drive transistor 110 is turned on under control of the initialization voltage $V_{init}$ applied to the third node C. In this way, the third node C and the fourth node D are applied with the initialization voltage $V_{init}$, and the drive transistor 110 is turned on.

For example, in the reset stage T1, a low level reset control signal Reset may be applied to the gate 161 of the reset transistor, and the reset transistor 160 is turned on, so that the initialization voltage $V_{init}$ applied to the source of the reset transistor 160 is applied to the fourth node D. In this way, the fourth node D can be initialized, so that the light-emitting element 18 can stop emitting light more quickly. In the reset stage T1, the gate 141 of the first control transistor is also applied with a low level first control signal Gate_N, the first control transistor 140 is turned on to enable a path between the fourth node D and the third node C, and the voltage at the third node C is the initialization voltage $V_{init}$. In the reset stage T1, the gate of the threshold compensation transistor 130 is also applied with a high level second control signal EM2, and the threshold compensation transistor 130 is turned on, to enable a path between the second node B and the third node C, and the voltage of the node C is the initialization voltage $V_{init}$. When the voltage of the third node C is the initialization voltage $V_{init}$, the drive transistor 110 can be turned on, so that the voltage of the first node A is the initialization voltage $V_{init}$. In this way, in the reset stage T1, the third node C and the fourth node D can be initialized.

In the reset stage T1, other transistors or units of the pixel drive circuit may also be turned off. For example, the light-emitting signal EM1 may not be applied to the second control unit 15, and the third control signal may not be applied to the data writing unit 12.

For example, in the reset stage T1, the gate 151 of the second control transistor is applied with a high level signal, so that the second control transistor 150 is turned off. The gate 121 of the data writing transistor is applied with a high level signal, so that the data writing transistor 120 is turned off.

Step S120, referring to FIG. 3, in the data writing stage T2, the data writing unit 12 is applied with the third control signal Gate_P and the data voltage $V_{data}$ to output the data voltage $V_{data}$ to the first node A. The threshold compensation transistor 130 is applied with the second control signal EM2, to enable a path between the second node B and the third node C. The drive transistor 110 is turned off after the third node C is written with the data voltage $V_{data}$ compensated by a threshold voltage of the drive transistor. In this way, the voltage of the third node C is the data voltage $V_{data}$ compensated by a threshold voltage of the drive transistor 110, namely $V_{data}$-Vth, where $V_{data}$ is the data voltage $V_{data}$, and Vth is the threshold voltage of the drive transistor 110.

For example, in the data writing stage T2, the gate 121 of the data writing transistor can be applied with a low level third control signal Gate_P, the source of the data writing transistor 120 can be applied with the data voltage $V_{data}$, and the data writing transistor 120 is turned on, so that the voltage of the first node A is the data voltage $V_{data}$. In the data writing stage T2, the gate of the threshold compensation transistor 130 may be applied with a high level second control signal EM2, and the threshold compensation transistor 130 is turned on, which enables a path between the second node B and the third node C. Since the drive transistor 110 has been turned on in the reset stage T1, the drive transistor 110 is in an on state at the initial stage of the data writing stage T2, which allows the first node A to charge the third node C through the drive transistor 110 and the threshold compensation transistor 130, so that the voltage of the third node C can be raised to make the drive transistor 110 turned off. When the drive transistor 110 is turned off, the voltage of the third node C is $V_{data}$+Vth.

In the data writing stage T2, other transistors or units of the pixel drive circuit may also be turned off. For example, the low level first control signal Gate_N may not be applied to the first control unit 14, the low level light-emitting signal EM1 may not be applied to the second control unit 15, and the low level reset control signal Reset may not be applied to the reset transistor 160.

For example, in the data writing stage T2, a high level signal may be applied to the gate 141 of the first control transistor, so that the first control transistor 140 is turned off. The gate 151 of the second control transistor can be applied with a high level signal, so that the second control transistor 150 is turned off. The gate 161 of the reset transistor can be applied with a high level signal, so that the reset transistor 160 is turned off.

Step S130, referring to FIG. 3, in the light-emitting stage T4, the second control unit 15 is applied with the light-emitting signal EM1, so that the first power supply voltage VDD is applied to the first node A. The first control unit 14 is applied with the first control signal Gate_N, which enables a path between the second node B and the fourth node D. In this way, the drive transistor 110 can output the driving current to the light-emitting element 18 under the control of the third node C, to drive the light-emitting element 18 to emit light.

At this time, the source voltage of the drive transistor 110 is $V_{DD}$, and the gate voltage is $V_{data}$+Vth; the gate-source voltage of the drive transistor 110 is Vgs=$V_{data}$+Vth−$V_{DD}$. The driving current $I_{on}$ flowing through the drive transistor 110 is:

$$I_{on} = \frac{1}{2}K \cdot (V_{gs} - V_{th})^2 = \frac{\mu W C_{ox}}{2L} \times (V_{DD} - V_{data})^2$$

where μ is the electron mobility of the channel region of the drive transistor 110, $C_{ox}$ is the insulation capacitance per unit area, and W/L is the width-length ratio of the channel region of the drive transistor 110.

Therefore, the magnitude of the driving current $I_{on}$ is only affected by the data voltage $V_{data}$ and is not affected by the threshold voltage Vth of the drive transistor 110. The pixel drive circuit and the driving method can realize the compensation of the threshold voltage Vth of the drive transistor 110, eliminate the influence of the difference in the threshold voltages of the drive transistors 110 of different pixel drive circuits on the display brightness uniformity of the display panel, and eliminate the change in display luminance due to the change in threshold voltage Vth of the drive transistor 110.

For example, in the light-emitting stage T4, a low level first control signal Gate_N may be applied to the first control transistor 140. The first control transistor 140 is turned on, which enables a path between the second node B and the fourth node D. The second control transistor 150 can also be applied with a low level light-emitting signal EM1, such that the second control transistor 150 is turned on. The first power supply voltage VDD applied to the source of the second control transistor 150 is applied to the source of the drive transistor 110. The drive transistor 110 outputs a driving current under the control of the third node C.

In the light-emitting stage T4, other transistors or units of the pixel drive circuit may also be turned off. For example, the data writing unit 12 may be applied with a high level signal, so that it does not output the data voltage $V_{data}$. The threshold compensation transistor 130 may be applied with a low level signal to make it off. The reset unit 16 may be applied with a high level signal, so that it does not output the initialization voltage $V_{unit}$.

For example, in the light-emitting stage T4, the gate 121 of the data writing transistor can be applied with a high level signal to turn it off. The gate of the threshold compensation transistor 130 can be applied with a low level signal to turn it off. The gate 161 of the reset transistor can be applied with a high level signal to turn it off.

It can be understood that, in each example of the above-mentioned driving method of the pixel drive circuit, as an example, the drive transistor 110, the data writing transistor 120, the first control transistor 140, the second control transistor 150 and the reset transistor 160 are all P-type transistors, and the threshold compensation transistor 130 is an N-type transistor. When the type of each transistor is changed, the gate voltage required to turn on or off each transistor can be changed accordingly.

Further, when the drive transistor 110, the data writing transistor 120, the first control transistor 140, the second control transistor 150 and the reset transistor 160 are all P-type transistors, and the threshold compensation transistor 130 is an N-type transistor, the driving method of the pixel drive circuit may also include the following step.

Immediately after step S120 and before step S130, referring to FIG. 3, in the signal holding stage T3, the gate 141 of the first control transistor may be applied with a high level signal that turns it off, and the gate of the threshold compensation transistor 130 may be applied with a low level signal that turns it off. In this way, when the time length of the signal holding stage T3 is the same as the time length of the reset stage T1, the time length of the high level signal applied to the gate 141 of the first control transistor is the same as the signal length of the second control signal EM2 applied to the gate of the threshold compensation transistor 130, and both are at a high level. Therefore, the same shift register unit can be shared between two adjacent rows of the pixel drive circuits, so that the high level scan signal generated by the shift register unit is simultaneously applied to the gates 141 of the first control transistors of the pixel drive circuits of the previous row and the gates of the threshold compensation transistors 130 of the pixel driver circuits of the next row. In this way, the number of shift registers of the display panel to which the pixel drive circuit is applied can be reduced.

Further, before step S130, the driving method of the pixel drive circuit may further include the following step.

There will also be a voltage holding stage between the signal holding stage T3 and the light-emitting stage T4. In the voltage holding stage, the gate 161 of the reset transistor, the gate 121 of the data writing transistor 120, and the gate 151 of the second control transistor can all be applied with a high level signal, so that the reset transistor 160, the data writing transistor 120 and the second control transistor 150 are kept off. A low level signal can be applied to the gate of the threshold compensation transistor 130, so that the threshold compensation transistor 130 is kept off. The first control transistor 140 is applied with a low level signal, so that the first control transistor 140 is kept on. In this way, once the light-emitting stage T4 is entered, the second control transistor 150 is turned on by the light-emitting signal EM1, so that the drive transistor 110 can generate a driving current and drive the light-emitting element 18 to emit light.

It can be understood that, in some embodiments, there may be no voltage holding stage between the signal holding stage T3 and the light-emitting stage T4. In other embodiments, the lengths of the voltage holding stages of the pixel drive circuits in two adjacent rows may be different.

Figure 5:
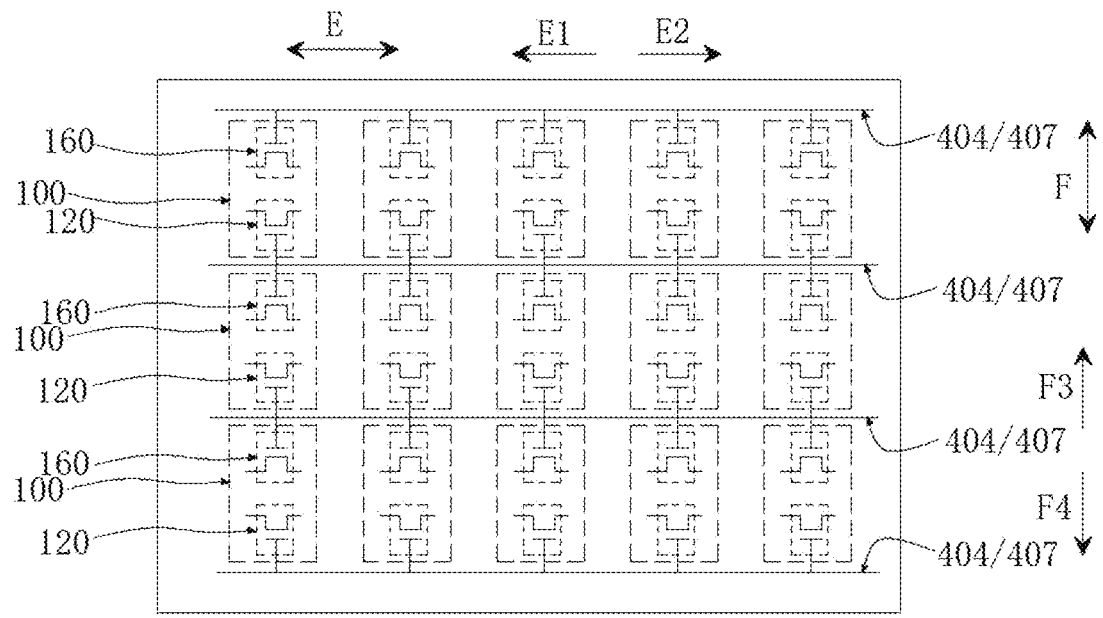
FIG. 5 is a schematic structural diagram of a display panel in an embodiment of the disclosure.

Embodiments of the present disclosure further provide a display panel, referring to FIG. 5, the display panel includes any one of the pixel drive circuits described in the foregoing pixel drive circuit embodiments. The display panel may be a mobile phone screen, a smart hand screen, a notebook computer screen, an electronic picture screen or other types of display panels. Since the display panel has any one of the pixel drive circuits described in the above-mentioned pixel drive circuit embodiments, it has the same beneficial effects, and details are not described here in the present disclosure.

In one embodiment of the present disclosure, referring to FIG. 5, the display panel includes a plurality of rows of the pixel drive circuits. When the data writing unit includes a data writing transistor 120 and the reset unit includes a reset transistor 160, in two adjacent rows of the pixel drive circuits, gates of the data writing transistors of the pixel drive circuits of a previous row are electrically connected with gates of the reset transistors of the pixel drive circuits of a next row.

Further, the display panel further includes a plurality of reset control leads in one-to-one correspondence with the plurality of rows of the pixel drive circuits. In two adjacent rows of the pixel drive circuits, the gates 121 of the data writing transistors of the pixel drive circuits of a previous row and the gates 161 of the reset transistors of the pixel drive circuits of a next row are connected to an identical reset control lead.

In the present disclosure, when two adjacent rows of pixel drive circuits are driven row by row, the pixel drive circuits driven first is the pixel drive circuits of the previous row, and the pixel drive circuits driven later is the pixel drive circuits of the next row. In this way, in two adjacent rows of pixel drive circuits, the third control signal Gate_P of the pixel drive circuits of the previous row and the reset control signal Reset of the pixel drive circuits of the next row are the same signal, and can be applied to the corresponding reset control lead of the pixel drive circuits of the next row, to realize the multiplexing of the signal. In this way, the number of leads extending along the row direction E and the number of shift registers can be reduced, thereby simplifying the structure of the display panel.

Figure 20:
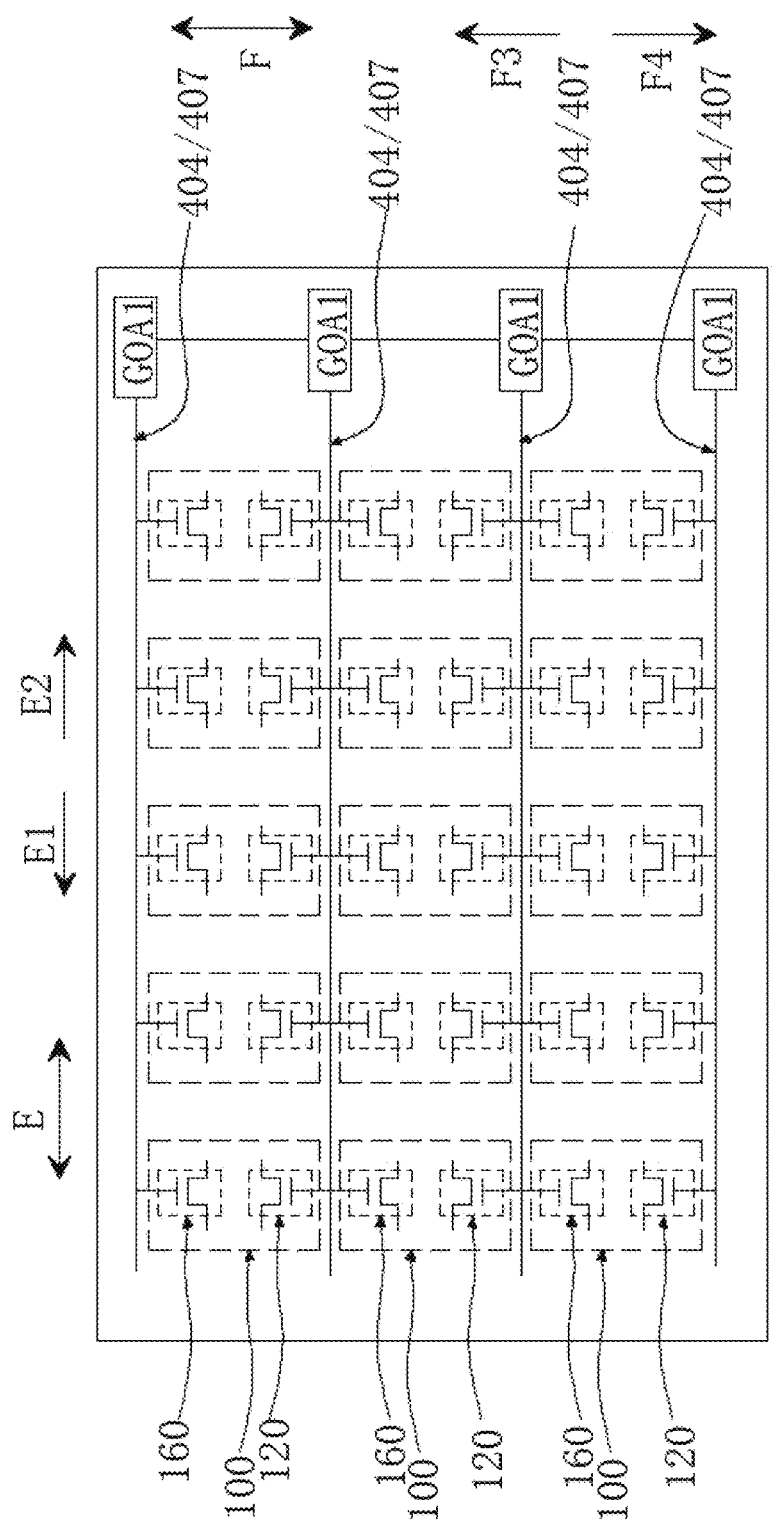
FIG. 20 shows the connection relationship between the cascaded first shift registers and respective leads in an embodiment of the present disclosure.

For example, referring to FIG. 20, the display panel includes a plurality of first leads 404/407 and a plurality of first shift registers GOA1 cascaded in sequence. Each of the first leads 404/407 extends in a row direction and is connected to an output end of each of the first shift registers GOA1 in one-to-one correspondence.

The number of the pixel drive circuits 100 is multiple and the plurality of the pixel drive circuits are arranged in a plurality of rows. The pixel drive circuits 100 of any two adjacent rows are electrically connected with an identical first lead 404/407. Any two adjacent first leads 404/407 are electrically connected with the pixel drive circuits 100 in an identical row. In the present disclosure, a row of pixel drive circuits includes respective pixel drive circuits arranged along the row direction.

In the pixel drive circuits of two adjacent rows, the first lead 404/407 is used as the fourth scan lead 404 to apply the third control signal to the pixel drive circuits of a previous row, and used as the reset control lead 407 to apply the reset control signal to the pixel drive circuits of a next row.

In other words, the display panel is provided with a reset control lead 407 and a fourth scan lead 404. The reset control lead 407 is used to apply the reset control signal Reset to the pixel drive circuit. The fourth scan lead 404 is used to apply the pixel drive circuit with the third control signal. In two adjacent rows of pixel drive circuits, the reset control lead 407 corresponding to the pixel drive circuits of the next row and the fourth scan lead 404 of the pixel drive circuits of the previous row are the same first lead 404/407, applied with the same signal, which makes that the third control signal Gate_P of the pixel drive circuits of the previous row and the reset control signal Reset of the pixel drive circuits of the next row are the same signal. The display panel includes a plurality of first shift registers GOA1 cascaded in sequence. The output ends of each first shift register GOA1 are connected to each first lead 404/407 in one-to-one correspondence, which makes that the signal output by the first shift register GOA1 can be applied to the pixel drive circuits of two adjacent rows, served as the third control signal Gate_P and the reset control signal Reset of the pixel drive circuits of the two rows. Further, the first shift register GOA1 can output a low level scan signal.

In an embodiment of the present disclosure, the display panel includes a plurality of rows of pixel drive circuits. When the first control unit 14 includes the first control transistor 140, in two adjacent rows of the pixel drive circuits, gates 141 of the first control transistors of the pixel drive circuits of a previous row are electrically connected with gates of the threshold compensation transistors 130 of the pixel drive circuits of a next row. Further, the display panel includes a plurality of first scan leads and a plurality of second scan leads arranged in one-to-one correspondence with the plurality of rows of the pixel drive circuits. The gates 141 of the first control transistors of the pixel drive circuits of any row are electrically connected with a corresponding first scan lead. The gates of the threshold compensation transistors 130 of the pixel drive circuits of any row are electrically connected with a corresponding second scan lead. In two adjacent rows of the pixel drive circuits, the first scan lead corresponding to the pixel drive circuits of the previous row is electrically connected with the second scan lead corresponding to the pixel drive circuits of the next row.

In this way, in two adjacent rows of pixel drive circuits, a shift register for generating high level scan signals can be set. The high level scan signals generated by the shift register can be applied to the first scan lead of pixel drive circuits in the previous row and the second scan lead of the the pixel drive circuits of the next row. The shift register for generating a high level can output a high level signal in the data writing stage T2 and the signal holding stage T3 of the pixel drive circuits in the previous row, i.e., output a high level signal in the reset stage T1 and the data writing stage T2 of the pixel drive circuits in the next row, and outputs a low level signal in other stages. In this way, the number of shift registers for generating a high level can be reduced, and the structure of the display panel can be simplified.

Further, when the gate of the threshold compensation transistor 130 includes a first gate 1311 and a second gate 1312, the display panel further includes a plurality of third scan leads arranged in one-to-one correspondence with the plurality of rows of the pixel drive circuits. The first gates 1311 of the threshold compensation transistors 130 of the pixel drive circuits of any row are electrically connected with the corresponding second scan lead. The second gates 1312 of the threshold compensation transistors 130 of the pixel drive circuits of any row are electrically connected with the corresponding third scan lead. The second scan lead and the third scan lead corresponding to the pixel drive circuits of any row are electrically connected.

Optionally, the display panel has a display region and a peripheral region surrounding the display region. The pixel drive circuit provided by the present disclosure may be disposed in the display region. The second scan lead and the third scan lead may be directly connected through a via hole or indirectly connected by other conductive structures in the peripheral region. The second scan lead and the third scan lead may not be directly connected in the display region.

Figure 21:
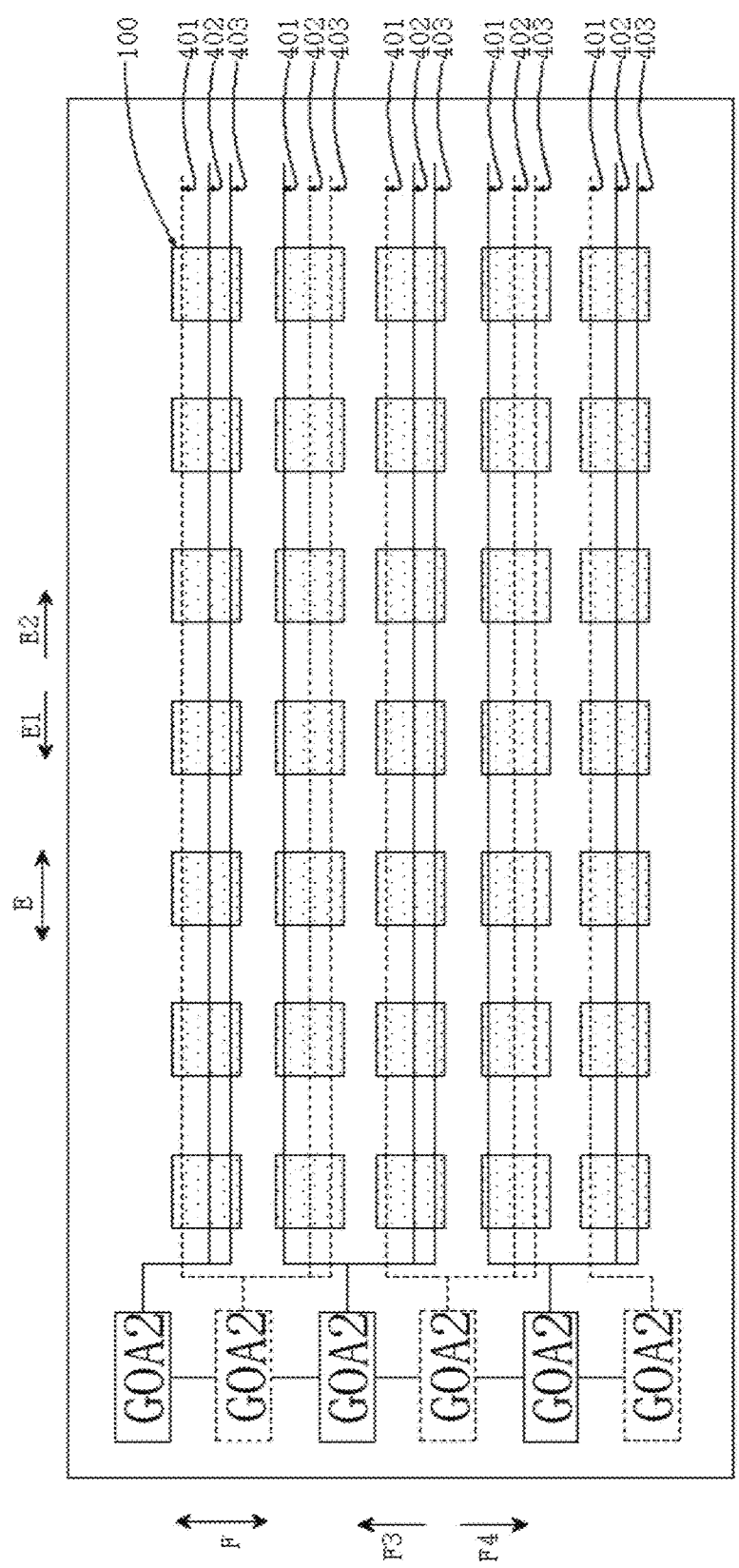
FIG. 21 shows the connection relationship between the cascaded second shift registers and respective leads in an embodiment of the disclosure.

For example, referring to FIG. 21, the number of the pixel drive circuits 100 is multiple and the plurality of the pixel drive circuits are arranged in plurality of rows. The number of the first scan leads 401 is multiple and all the first scan leads extend along a row direction, and the plurality of the first scan leads 401 are electrically connected with the plurality of rows of the pixel drive circuits in one-to-one correspondence. The number of the second scan leads 402 is multiple and all the second scan leads extend along the row direction, and the plurality of the second scan leads 402 are electrically connected with the plurality of rows of the pixel drive circuits in one-to-one correspondence. The number of the third scan leads 403 is multiple and all the third scan leads extend along the row direction, and the plurality of the third scan leads 403 are electrically connected with the plurality of rows of the pixel drive circuits in one-to-one correspondence.

The display panel further includes a plurality of second shift registers GOA2 cascaded in sequence.

In the pixel drive circuits of any two adjacent rows, the second scan lead 402 and the third scan lead 403 connected to the pixel drive circuits of the next row, and the first scan lead 401 connected to the pixel driving circuits of the previous row are connected to an output end of an identical second shift register unit GOA2.

In the first scan lead 401, the second scan lead 402 and the third scan lead 403 connected to the pixel driving circuits of any row, the first scan lead 401 and the second scan lead 402 are respectively connected to output ends of two adjacent second shift register units GOA2, the second scan lead 402 and the third scan lead 403 are connected to the output end of an identical second shift register GOA2.

In an embodiment of the present disclosure, the second shift register GOA2 can output a high level scan signal.

Preferably, the first gate 1311 is provided in the same layer as the second scan lead, and the second gate 1312 is provided in the same layer as the third scan lead.

For example, the first gate 1311 is multiplexed as part of the second scan lead. In other words, the second scan lead 402 overlaps with the channel region 132 of the threshold compensation transistor, and the overlapping portion of the second scan lead serves as the first gate 1311 of the threshold compensation transistor 130.

For example, the second gate 1312 is multiplexed as part of the third scan lead. In other words, the third scan lead overlaps the channel region 132 of the threshold compensation transistor, and the overlapping portion of the third scan lead serves as the second gate 1312 of the threshold compensation transistor 130.

The present disclosure also provides a display panel, referring to FIG. 19, the display panel includes a base substrate 201, a drive circuit layer 202 and a display device layer 203 that are stacked in sequence. The drive circuit layer 202 includes a a polysilicon semiconductor layer 310, a first gate insulating layer 320, a first gate layer 330, a first interlayer dielectric layer 340, a metal oxide semiconductor layer 350, a second gate insulating layer 360, a second gate layer 370, a second interlayer dielectric layer 380 and a metal wiring layer 390 that are stacked in sequence on the base substrate 201.

Figure 6:
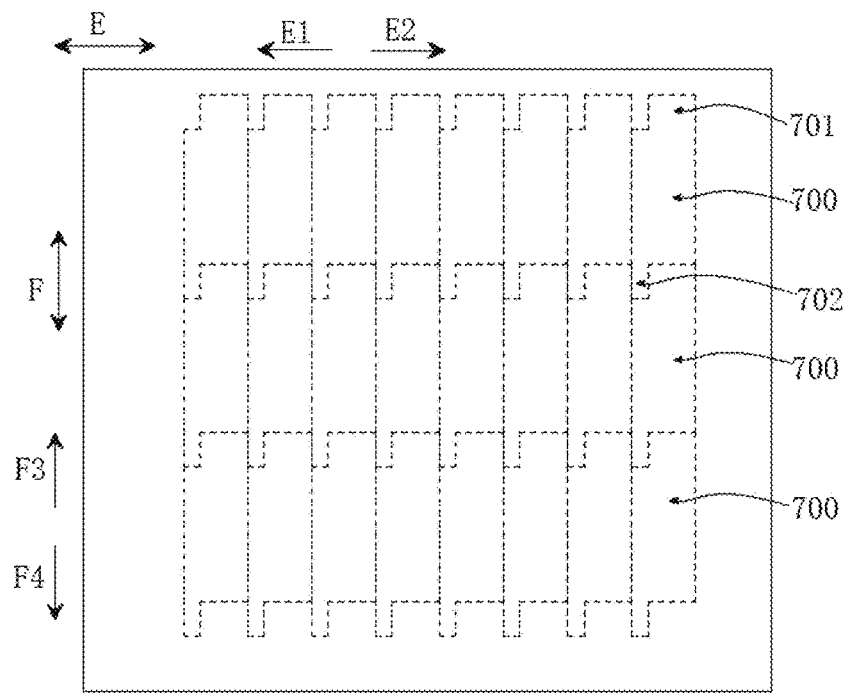
FIG. 6 is a schematic diagram of the distribution of pixel circuit regions in an embodiment of the disclosure.

Referring to FIG. 6, the display panel has a pixel circuit region 700. In an embodiment of the present disclosure, the display panel includes a plurality of pixel circuit regions 700 arranged in an array. Along the column direction F, one end of any pixel circuit region 700 has a first protruding region 701, and the other end has a second protruding region 702. In two adjacent pixel circuit regions 700 in the same column, the first protruding region 701 of the pixel circuit region 700 in the previous row and the second protruding region 702 of the pixel circuit region 700 in the next row are adjacent and complementary.

In the pixel circuit region 700, the drive circuit layer 202 includes a drive transistor 110, a storage capacitor 17, a threshold compensation transistor 130, a first control transistor 140, a second control transistor 150, a data writing transistor 120 and a reset transistor 160. The display device layer 203 includes a light-emitting element 18 corresponding to the pixel circuit region 700. Any one of the transistors includes an active region, and the active region includes a source, a channel region and a drain that are connected in sequence.

Figure 7:
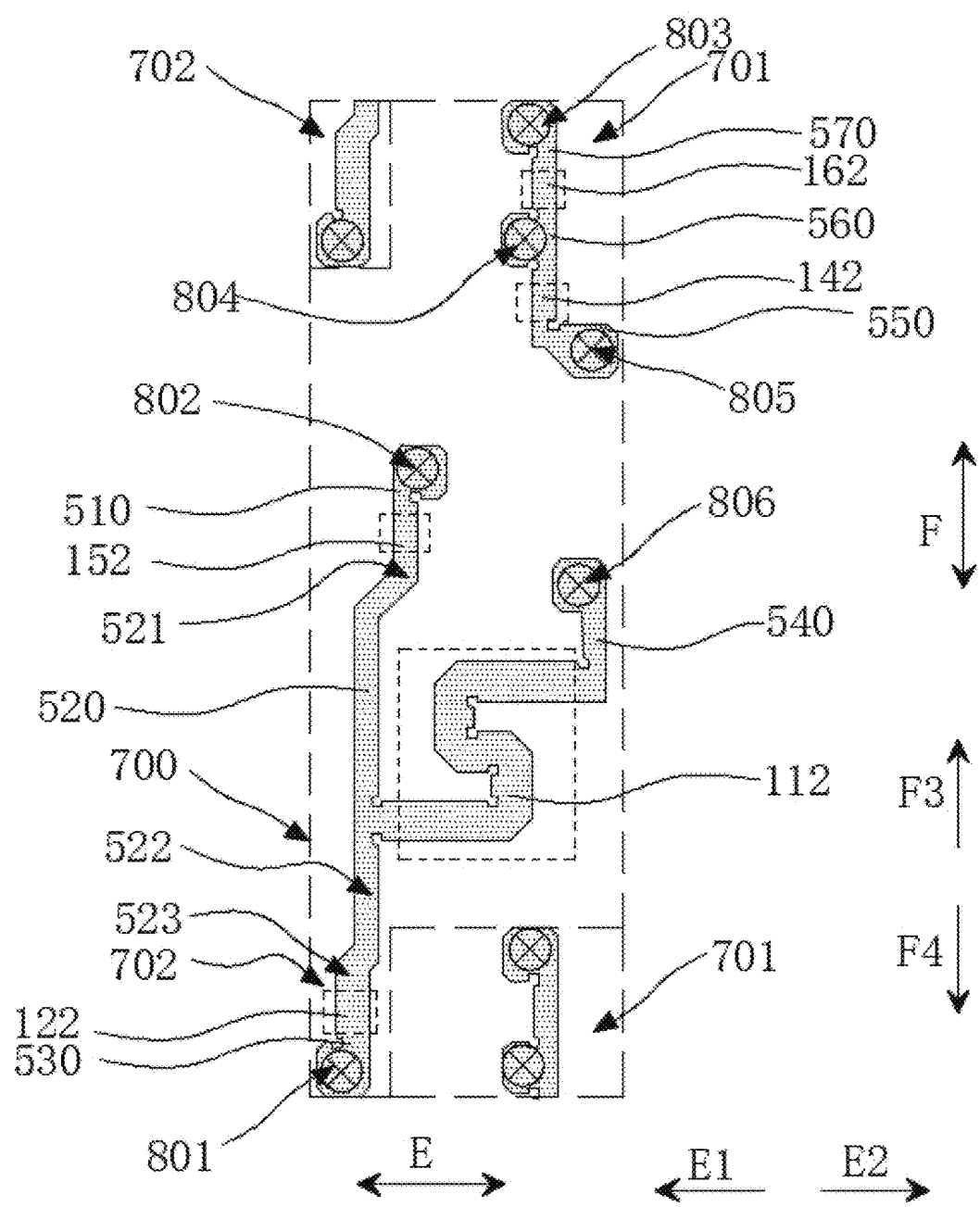
FIG. 7 is a schematic structural diagram of a polysilicon semiconductor layer in a pixel circuit region according to an embodiment of the disclosure.
Figure 8:
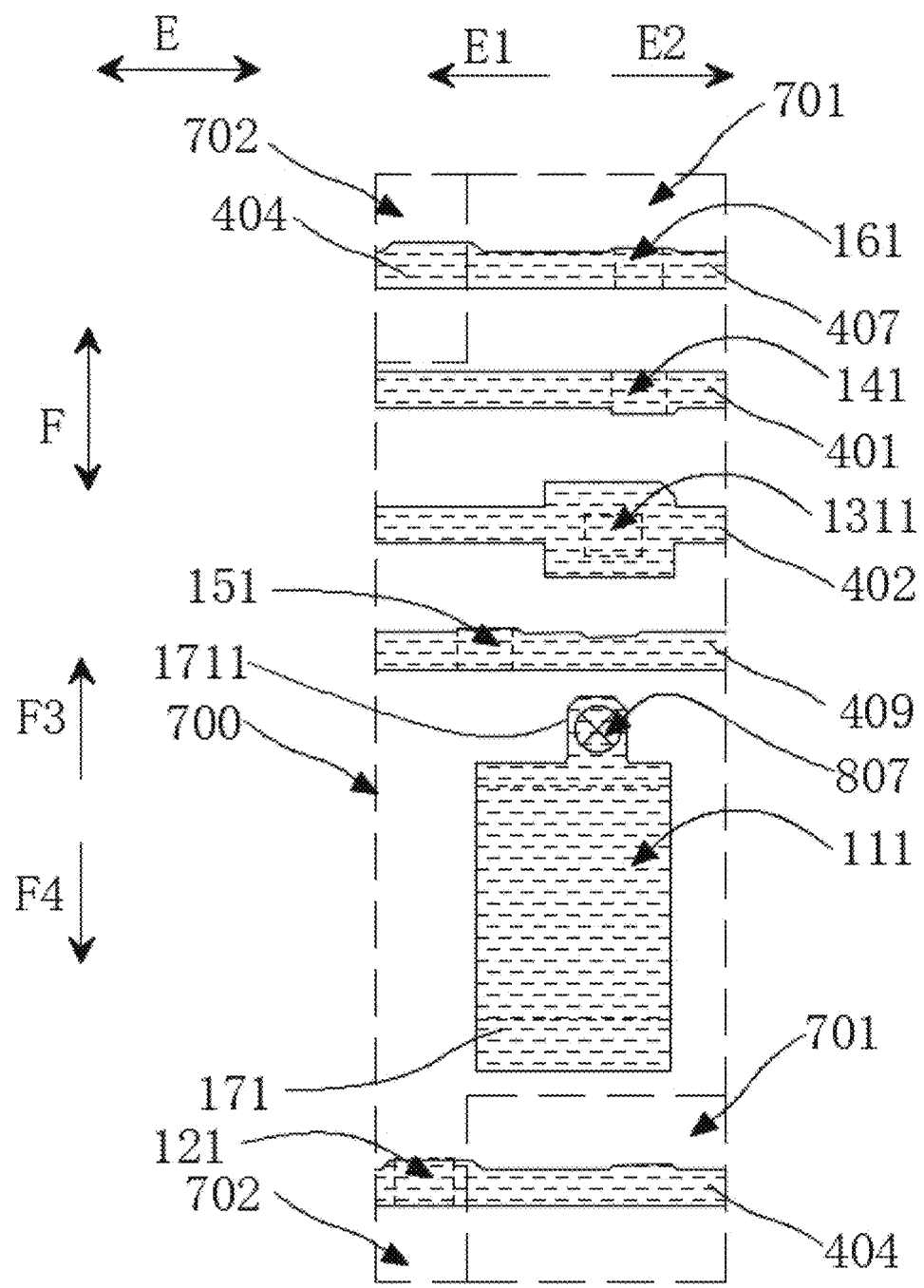
FIG. 8 is a schematic structural diagram of a first gate layer in a pixel circuit region according to an embodiment of the disclosure.

Referring to FIG. 7, the polysilicon semiconductor layer 310 includes a connection lead, an active region of the drive transistor 110 (112 is the channel region of the drive transistor 110), and an active region of the first control transistor 140 (142 is the channel region of the first control transistor 140), the active region of the second control transistor 150 (152 is the channel region of the second control transistor 150), the active region of the data writing transistor 120 (122 is the channel region of the data writing transistor 120), and the active region of the reset transistor 160 (162 is the channel region of the reset transistor 160). Referring to FIG. 8, the first gate layer 330 includes the gate 111 of the drive transistor, the gate 141 of the first control transistor, the gate 151 of the second control transistor, the gate 121 of the data writing transistor, and the gate 161 of the reset transistor. The first gate insulating layer 320 isolates the gates and channel regions of the drive transistor 110, the first control transistor 140, the second control transistor 150, the data writing transistor 120 and the reset transistor.

Figure 10:
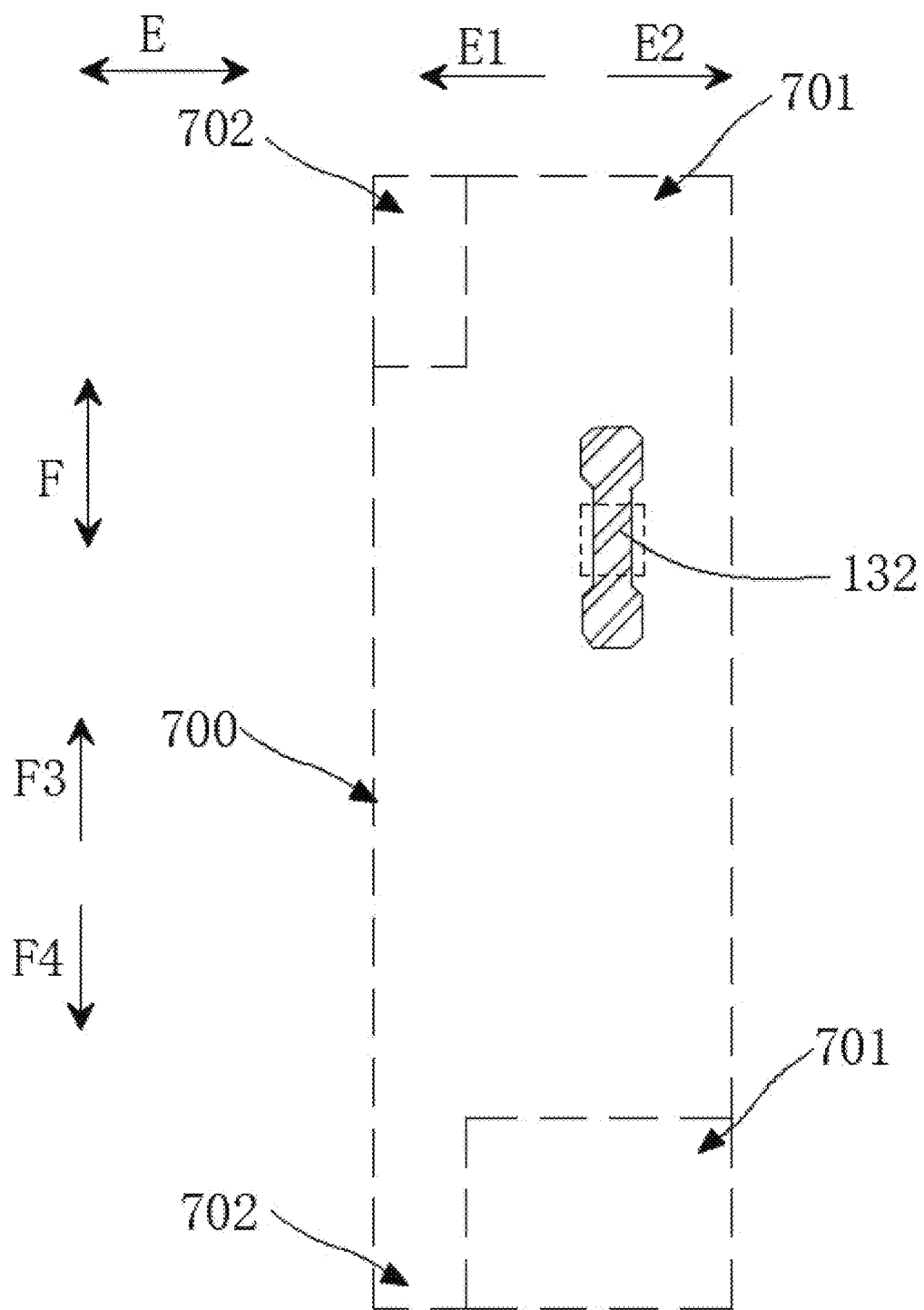
FIG. 10 is a schematic structural diagram of a metal oxide semiconductor layer in a pixel circuit region according to an embodiment of the disclosure.

Referring to FIG. 10, the metal oxide semiconductor layer 350 includes the active region of the threshold compensation transistor 130 (132 is the channel region of the threshold compensation transistor 130). Referring to FIG. 19, the gate of the threshold compensation transistor 130 is located in the first gate layer 330 and/or the second gate layer 370. Referring to FIG. 19, the first electrode and the second electrode of the storage capacitor 17 are located in at least two layers among the first gate layer 330, the second gate layer 370 and the metal wiring layer 390.

Referring to FIGS. 8, 12, 14 and 16, the drive circuit layer 202 further includes a first scan lead 401, a second scan lead 402, a fourth scan lead 404, a reset control lead 407, an initialization signal lead 408, a light-emitting signal lead 409, a data voltage lead 405 and a first power supply voltage lead 406.

Refereeing to FIGS. 7 to 17, the metal wiring layer 390 includes metal wiring. The metal wiring and the connection lead make the source of the drive transistor 110 electrically connected to the drain of the data writing transistor 120 and the drain of the second control transistor 150, so that the drain of the drive transistor 110 is electrically connected to the source of the threshold compensation transistor 130 and the source of the first control transistor 140, the gate 111 of the drive transistor is electrically connected to the source and drain of the threshold compensation transistor 130 and the first electrode of the storage capacitor 17, the source of the second control transistor 150 is electrically connected to the second electrode of the storage capacitor 17 and the first power supply voltage lead 406, the drain of the first control transistor 140 is electrically connected to the first end of the light-emitting element 18 and the drain of the reset transistor 160, the source of the data writing transistor 120 is electrically connected to the data voltage lead 405, the gate 151 of the second control transistor is electrically connected to the light-emitting signal lead 409, the gate 121 of the data writing transistor is electrically connected to the fourth scan lead 404, the gate of the threshold compensation transistor 130 is electrically connected to the second scan lead 402, the gate 141 of the first control transistor is electrically connected to the first scan lead 401, the source of the reset transistor 160 is electrically connected to the initialization signal lead 408, and the gate 161 of the reset transistor is electrically connected to the reset control lead 407.

In this way, in the pixel circuit region 700, the display panel is provided with a pixel drive circuit composed of the drive transistor 110, the storage capacitor 17, the threshold compensation transistor 130, the first control transistor 140, the second control transistor 150, the data writing transistor 120, the reset transistor 160 and the light-emitting element 18. The pixel drive circuit is described in detail in the above-mentioned pixel drive circuit embodiment, and its working process and beneficial effects are not repeated here.

The base substrate 201 may be the base substrate 201 of inorganic materials, or may be the base substrate 201 of organic materials. For example, in one embodiment of the present disclosure, the material of the base substrate 201 may be glass materials such as soda-lime glass, quartz glass, sapphire glass, or the like, or may be metal materials such as stainless steel, aluminum, and nickel. In another embodiment of the present disclosure, the material of the base substrate 201 may be Polymethyl methacrylate (PMMA), Polyvinyl alcohol (PVA), Polyvinyl phenol (PVP), Polyether sulfone (PES), polyimide, polyamide, polyacetal, Poly carbonate (PC), PolyethylenEterephthalate (PET), PolyethylenEnaphthalate (PEN) or a combination thereof. In another embodiment of the present disclosure, the base substrate 201 may also be a flexible base substrate 201. For example, the material of the base substrate 201 may be polyimide (PI). The base substrate 201 may also be a composite of multi-layer materials. For example, in an embodiment of the present disclosure, the base substrate 201 may include a Bottom Film, a pressure-sensitive adhesive layer, a first polyimide layer 2011 and a second polyimide layer 2013 which are stacked in sequence. In another embodiment of the present disclosure, referring to FIG. 19, the base substrate 201 may include a first polyimide layer 2011, a first shielding layer 2012, a second polyimide layer 2013 and a second polyimide shielding layer 2014 which are stacked in sequence.

Referring to FIG. 19, a polysilicon semiconductor layer 310 is provided on one side of the base substrate 201, for forming an active region of a low temperature polysilicon transistor and for forming connection leads. Optionally, the channel region of the low temperature polysilicon transistor may be N-doped, the source and drain of the low temperature polysilicon transistor may be P-doped, and the connection lead may be P-doped. In this way, the drive transistor 110, the first control transistor 140, the second control transistor 150, the data writing transistor 120, the reset transistor 160, and the like are all P-type transistors.

The materials of the first gate insulating layer 320, the second gate insulating layer 360, the first interlayer dielectric layer 340 and the second interlayer dielectric layer 380 may be selected from dielectric materials such as silicon nitride, silicon oxide, and silicon oxynitride, etc. The materials of any two layers may be the same or different. For example, the materials of the first gate insulating layer 320 and the second gate insulating layer 360 are both silicon oxide, and the materials of the first interlayer dielectric layer 340 and the second interlayer dielectric layer 380 may be silicon nitride.

Optionally, referring to FIG. 19, the metal wiring layer 390 may include a first metal wiring layer 391, a first planarization layer 392 and a second metal wiring layer 391 which are sequentially stacked on the side of the second interlayer dielectric layer 380 away from the base substrate 201. The first planarization layer 392 may be an organic or inorganic insulating material. Preferably, the material of the first planarization layer 392 may be an organic material, especially a photosensitive organic material. For example, the material of the first planarization layer 392 may be polyimide.

Further optionally, referring to FIG. 19, a passivation layer 395 may be further disposed between the first metal wiring layer 391 and the first planarization layer 392. The passivation layer 395 may partially cover the first metal wiring layer 391 to protect the first metal wiring layer 391. The material of the passivation layer 395 may be a dielectric material such as silicon nitride, silicon oxide, and silicon oxynitride. Preferably, the material of the passivation layer 395 is silicon nitride.

Optionally, referring to FIG. 19, the drive circuit layer 202 may further be provided with a first buffer layer 2021 located between the base substrate 201 and the polysilicon semiconductor layer 310. The material of the first buffer layer 2021 may be silicon nitride, silicon oxide, silicon oxynitride and other dielectric materials. Preferably, the material of the first buffer layer 2021 is silicon oxide.

Optionally, referring to FIG. 19, the drive circuit layer 202 may further be provided with a second buffer layer 2022 located between the first interlayer dielectric layer 340 and the metal oxide semiconductor layer 350. The material of the second buffer layer 2022 may be silicon nitride, silicon oxide, silicon oxynitride and other dielectric materials. Preferably, the material of the second buffer layer 2022 is silicon oxide.

Optionally, referring to FIG. 19, the metal wiring layer 390 may further be provided with a second planarization layer 394. The second planarization layer 394 is located on the side of the second metal wiring layer 393 away from the base substrate 201, so as to provide a planarized surface for the light-emitting element 18 in the display device layer 203. The material of the second planarization layer 394 may be an organic material, especially a photosensitive organic material. For example, the material of the second planarization layer 394 may be polyimide.

Referring to FIG. 19, the display device layer 203 is disposed on the surface of the drive circuit layer 202 away from the base substrate 201, and has a light-emitting element 18 corresponding to each pixel circuit region 700. The light-emitting element 18 is electrically connected to the drain of the first control transistor 140 (142 is the channel region of the first control transistor 140) in the corresponding pixel circuit region 700. The light-emitting element 18 may be an OLED (organic electroluminescent diode), a PLED (polymer organic electroluminescent diode), a QD-OLED (quantum dot-organic light emitting diode), a micro LED (micro light emitting diode), or other types of current driven light-emitting elements 18. Preferably, the light-emitting element 18 may be an OLED.

In the following, a display device layer 203 is introduced by taking the light-emitting element 18 as an organic electroluminescent diode as an example. The exemplary display device layer 203 may include a pixel electrode layer, a pixel definition layer, a support pillar layer, an organic light-emitting functional layer and a common electrode layer that are stacked in sequence. The pixel electrode layer has a pixel electrode corresponding to each pixel circuit region 700, and the pixel electrode can be electrically connected to the drain of the first control transistor 140 through the metal wiring layer 390. The pixel definition layer has a plurality of penetrating pixel openings arranged in one-to-one correspondence with the plurality of pixel electrodes, and any one of the pixel openings exposes at least a partial region of the corresponding pixel electrode. The support pillar layer includes a plurality of support pillars. The support pillars are located on the surface of the pixel definition layer away from the base substrate 201, so as to support a FinEMetal Mask (FMM) during the evaporation process. The organic light-emitting functional layer at least covers the pixel electrodes exposed by the pixel definition layer. The organic light-emitting functional layer may include an organic electroluminescent material layer, and may include one or more of a hole injection layer, a hole transport layer, an electron blocking layer, a hole blocking layer, an electron transport layer and an electron injection layer. Each film layer of the organic light-emitting functional layer can be prepared by an evaporation process, and a fine metal mask or an open mask can be used to define the pattern of each film layer during the evaporation. The common electrode layer may cover the organic light-emitting functional layer. In this way, the pixel electrode, the common electrode layer and the organic light emitting functional layer between the pixel electrode and the common electrode layer form an organic light emitting diode.

Optionally, the display panel may further include a thin film encapsulation layer on the side of the display device layer 203 away from the base substrate 201. The thin film encapsulation layer may include an inorganic encapsulation layer and an organic encapsulation layer which are alternately stacked. The inorganic encapsulation layer can effectively block external moisture and oxygen, and prevent the water and oxygen from invading the organic light-emitting functional layer to result in material degradation. Optionally, the edge of the inorganic encapsulation layer may be located in the peripheral region, especially on the side of the baffle away from the display region, so as to achieve a better water-oxygen isolation effect by means of the baffle. The organic encapsulation layer is located between two adjacent inorganic encapsulation layers, in order to achieve planarization and reduce stress between the inorganic encapsulation layers. The edge of the organic encapsulation layer is located between the display region and the baffle. For example, the thin film encapsulation layer includes a first inorganic encapsulation layer, an organic encapsulation layer and a second inorganic encapsulation layer which are sequentially laminated on the side of the display device layer 203 away from the base substrate 201.

Figure 12:
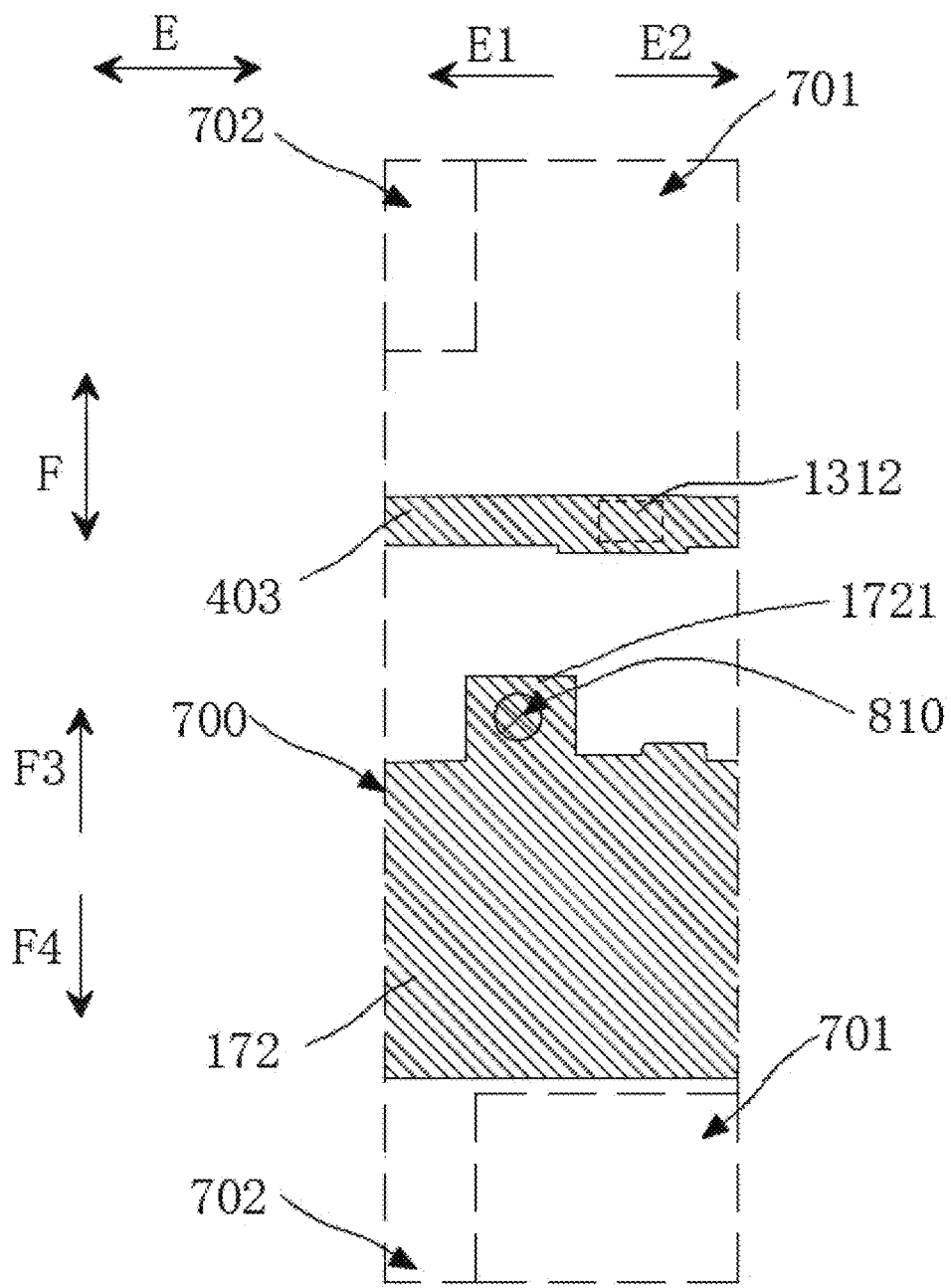
FIG. 12 is a schematic structural diagram of a second gate layer in a pixel circuit region in an embodiment of the disclosure.

In some embodiments, the drive circuit layer 202 further includes a third scan lead 403. The third scan lead 403 and the second scan lead 402 are electrically connected. Referring to FIGS. 8 and 12, the gate of the threshold compensation transistor 130 includes a first gate 1311 located in the first gate layer 330 and a second gate 1312 located in the second gate layer 370. The first gate 1311 is electrically connected to the second scan lead 402, and the second gate 1312 is electrically connected to the third scan lead 403. In this way, the gate of the threshold compensation transistor 130 includes the first gate 1311 and the second gate 1312. The channel region 132 of the threshold compensation transistor is sandwiched between the first gate 1311 and the second gate 1312, and the first gate 1311 and the second gate 1312 are used to simultaneously apply the same signal. This can reduce the floating body effect, further enhance the ability of the pixel drive circuit to be suitable for low frequency driving, further improve the problem of low frequency flickering under the low gray scale, and further reduce the power consumption of the pixel drive circuit.

Figure 11:
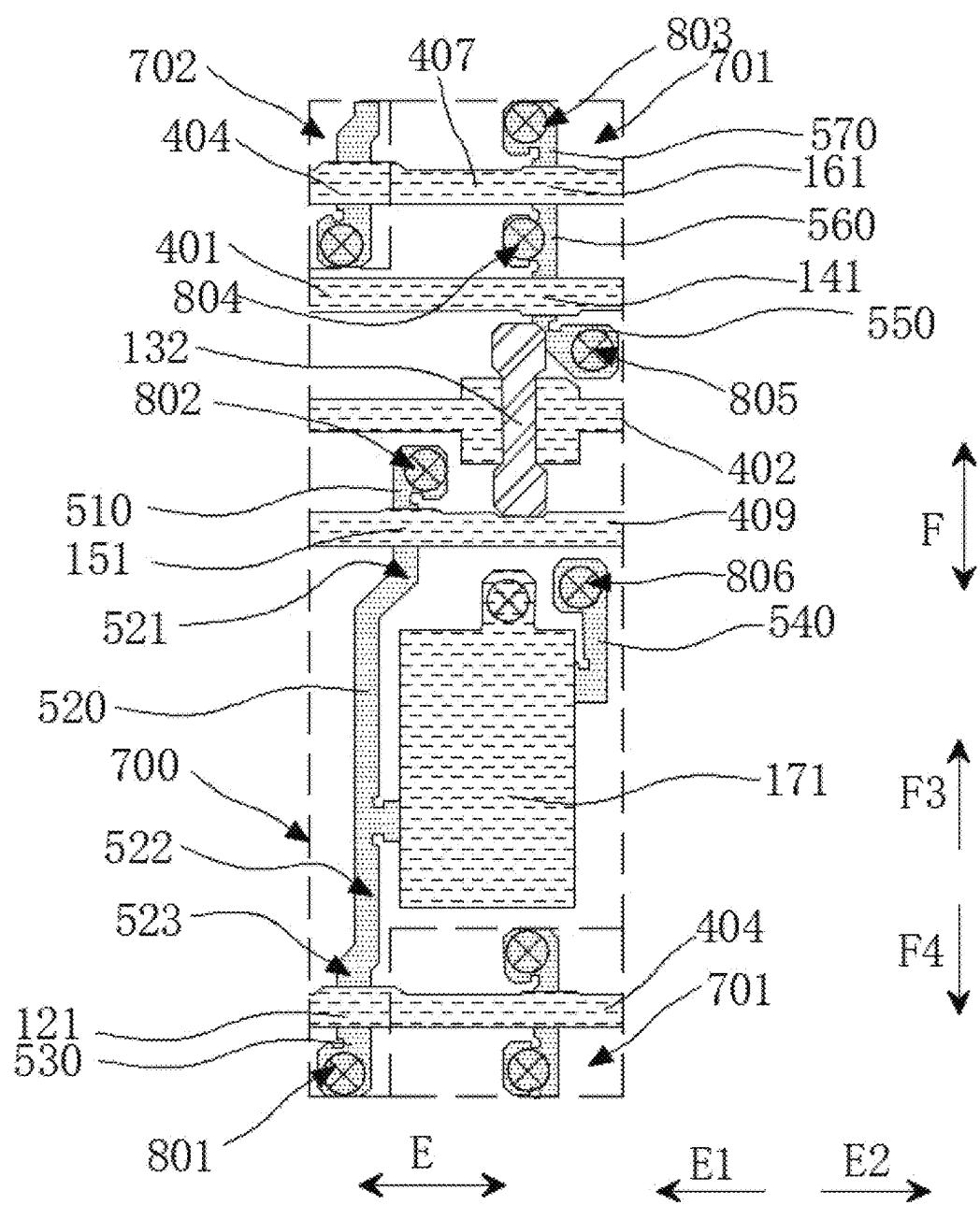
FIG. 11 is a schematic structural diagram of a polysilicon semiconductor layer, a first gate layer and a metal oxide semiconductor layer in a pixel circuit region in an embodiment of the disclosure.
Figure 13:
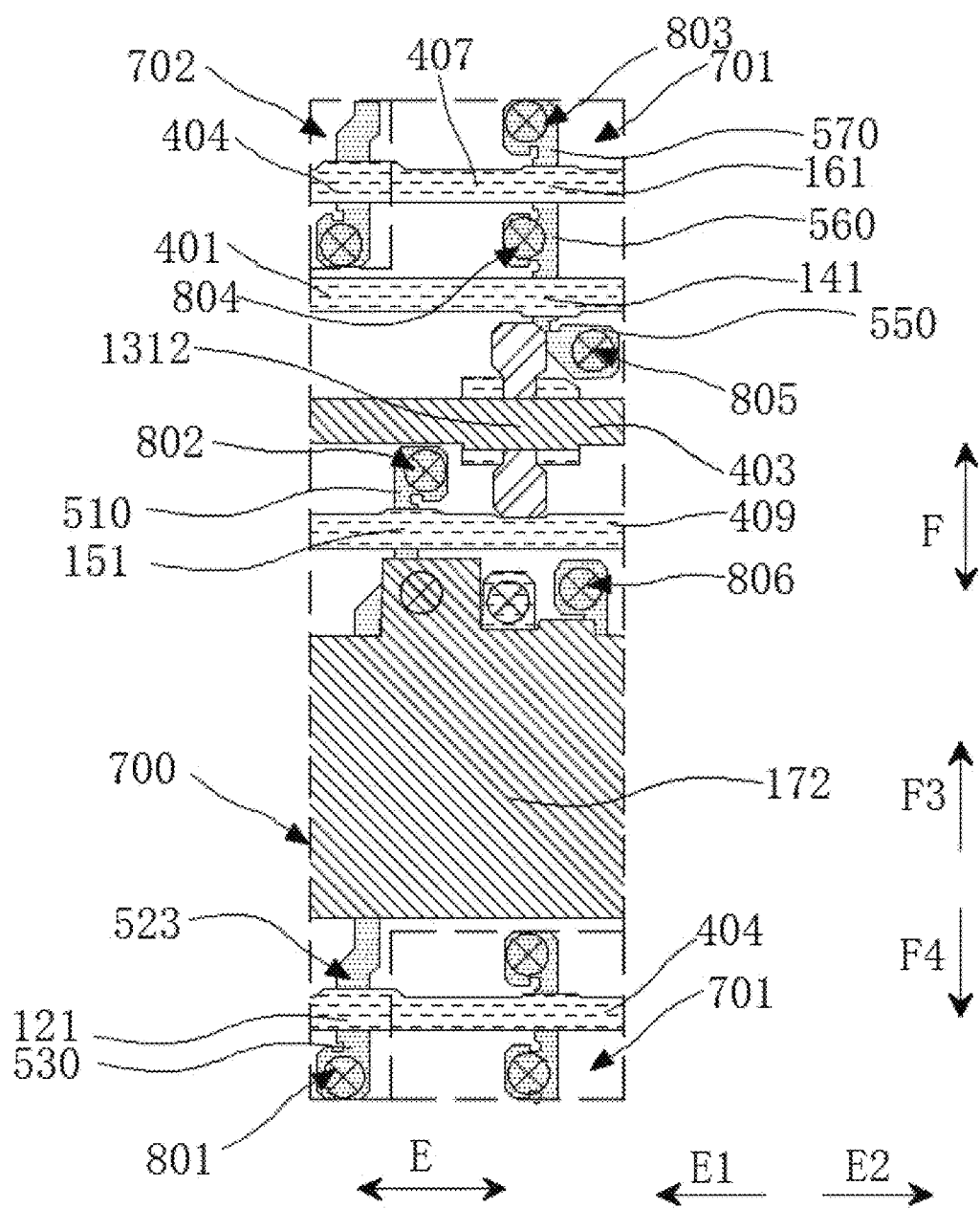
FIG. 13 is a schematic structural diagram of a polysilicon semiconductor layer, a first gate layer, a metal oxide semiconductor layer, and a second gate layer in a pixel circuit region in an embodiment of the disclosure.

Optionally, referring to FIG. 11 and FIG. 13, the orthographic projection of the channel region 132 of the threshold compensation transistor on the first gate layer 330 is located in the first gate 1311. Furthermore, the orthographic projection of the channel region 132 of the threshold compensation transistor on the first gate layer 330 is completely located in the first gate 1311. In this way, the first gate 1311 can block the channel region 132 of the threshold compensation transistor on the side close to the base substrate 201, to prevent light from irradiating the channel region 132 of the threshold compensation transistor from the side of the channel region 132 of the threshold compensation transistor close to the base substrate 201, thereby improving the stability of the characteristics of the threshold compensation transistor 130.

Optionally, referring to FIG. 8, the second scan lead 402 is disposed in the first gate layer 330 and extends along the row direction E. The first gate 1311 may be multiplexed as a part of the second scan lead 402. In other words, the orthographic projection of the channel region 132 of the threshold compensation transistor on the first gate layer 330 is located in the second scan lead 402. The portion of the second scan lead 402 directly facing the channel region 132 of the threshold compensation transistor can be used as the first gate 1311 of the threshold compensation transistor 130.

In one embodiment of the present disclosure, only the first interlayer dielectric layer 340 is disposed between the first gate 1311 and the channel region 132 of the threshold compensation transistor.

In another embodiment of the present disclosure, referring to FIG. 19, a second buffer layer 2022 is further disposed between the first interlayer dielectric layer 340 and the channel region 132 of the threshold compensation transistor. In this way, at the position of the display panel where the channel region of the threshold compensation transistor 130 is located, the first gate 1311, the first interlayer dielectric layer 340, the second buffer layer 2022, the channel region 132 of the threshold compensation transistor 130, the second gate insulating layer 360 and the second gate 1312 are sequentially stacked along the direction away from the base substrate 201.

Optionally, referring to FIG. 12, the third scan lead 403 is disposed in the second gate layer 370 and extends along the row direction E. The second gate 1312 can be multiplexed as a part of the third scan lead 403. In other words, the orthographic projection of the channel region 132 of the threshold compensation transistor on the second gate layer 370 is in the third scan lead 403. The portion of the third scan lead 403 directly facing the channel region 132 of the threshold compensation transistor may serve as the second gate 1312 of the threshold compensation transistor 130.

In some embodiments, referring to FIG. 19, the metal wiring layer 390 includes a first metal wiring layer 391 and a second metal wiring layer 393 located on a side of the first metal wiring layer 391 away from the base substrate 201. The first electrode of the storage capacitor 17 includes a first electrode plate 171 located in the first gate layer 330 and a third electrode plate 173 located in the first metal wiring layer 391, which are electrically connected to each other. The second electrode of the storage capacitor 17 includes a second electrode plate 172 located in the second gate layer 370 and a fourth electrode plate 174 located in the second metal wiring layer 393 that are electrically connected to each other. The orthographic projections of the first electrode plate 171, the second electrode plate 172, the third electrode plate 173 and the fourth electrode plate 174 on the base substrate 201 have a common overlapping region. In other words, the pixel circuit region 700 may further be provided with an overlapping region, and the orthographic projection of any electrode plate from the first electrode plate 171 to the fourth electrode plate 174 on the base substrate 201 includes the overlapping region.

In this way, the storage capacitor 17 has a larger capacitance, which further enhances the capability of the pixel drive circuit to be suitable for the low frequency driving, and further improves the problem of low frequency flickering under the low gray scale. Especially, when the first interlayer dielectric layer 340 and the second buffer layer 2022 are disposed between the first gate layer 330 and the second gate layer 370 of the present disclosure, in order to reduce the number of masks and reduce the number of times of the photolithography process, the first interlayer dielectric layer 340 and the second buffer layer 2022 may not be patterned before the metal wiring layer 390 is formed. In this way, the first interlayer dielectric layer 340 and the second buffer layer 2022 are sandwiched between the first electrode plate 171 and the second electrode plate 172, resulting in an increase in the thickness between the two electrode plates and a decrease in the capacitance. However, in the present disclosure, by disposing the third electrode plate 173 and the fourth electrode plate 174, the third electrode plate 173 forms a capacitance with the second electrode plate 172 and the fourth electrode plate 174 at the same time, which can overcome the problem of reducing the capacitance caused by the increased distance between the first electrode plate 171 and the second electrode plate 172, and further improve the capacitance of the storage capacitor 17.

Figure 9:
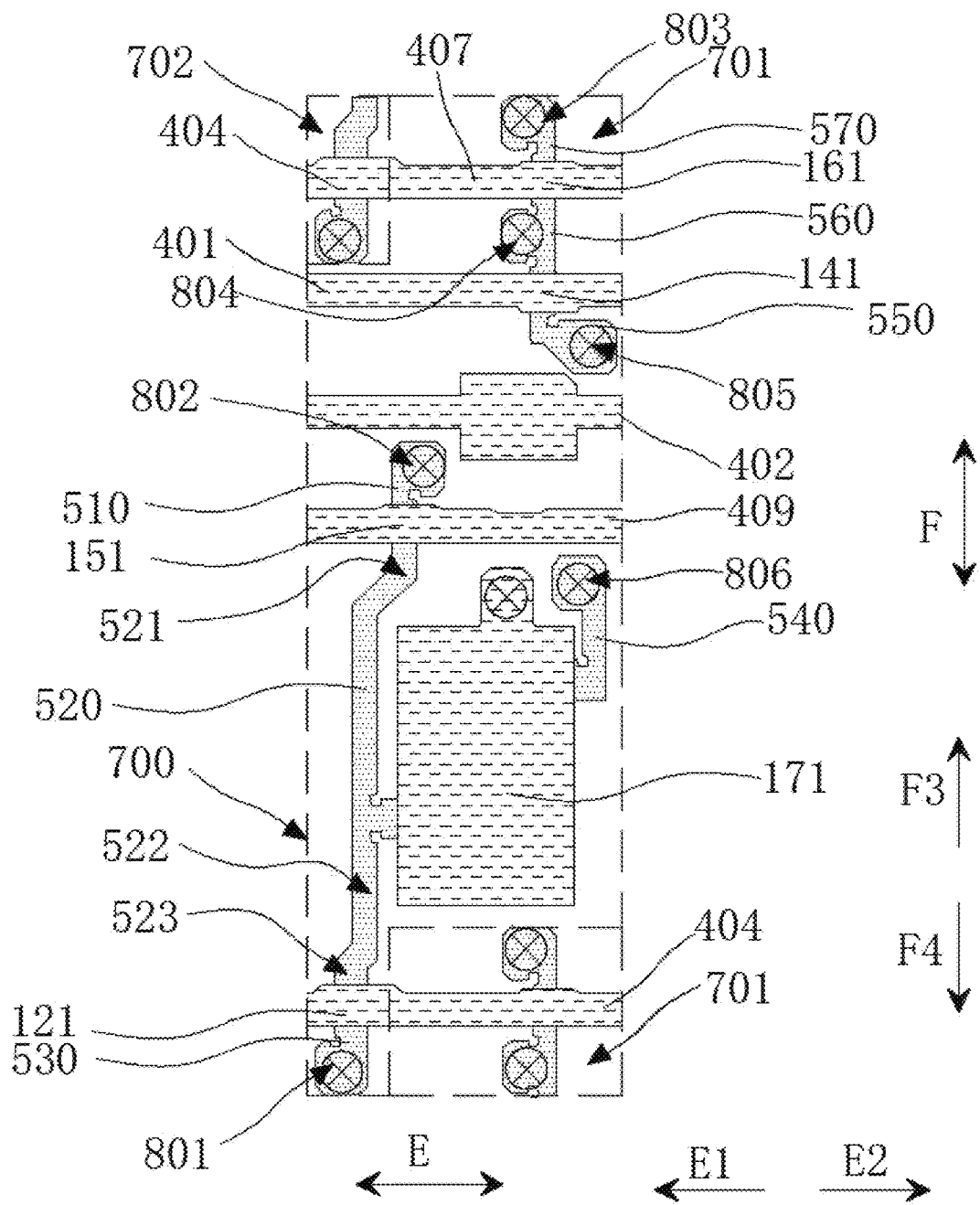
FIG. 9 is a schematic structural diagram of a polysilicon semiconductor layer and a first gate layer in a pixel circuit region in an embodiment of the disclosure.

Optionally, referring to FIGS. 7, 8 and 9, the first electrode plate 171 covers the channel region 112 of the drive transistor, for multiplexing as the gate 111 of the drive transistor. In this way, the gate 111 of the drive transistor is a part of the first electrode plate 171, which can simplify the structure of the display panel.

Optionally, referring to FIG. 6, the display panel includes a plurality of pixel circuit regions 700 arranged in the same row. Referring to FIGS. 12 and 13, the two second electrode plates 172 in the two adjacent pixel circuit regions 700 arranged in the same row are connected to each other. In this way, the two adjacent second electrode plates 172 in the same row are electrically connected, and the two adjacent second electrode plates 172 in the same column are both connected to the first power supply voltage lead 406 extending along the column direction F. This allows, when the first power supply voltage VDD is applied to the first power supply voltage lead 406, the second electrode plate 172 for applying the first power supply voltage VDD and the first power supply voltage lead 406 form a grid shape as a whole, which can reduce the voltage drop of the first power supply voltage VDD and improve the uniformity of the first power supply voltage VDD applied at different positions on the display panel.

Figure 14:
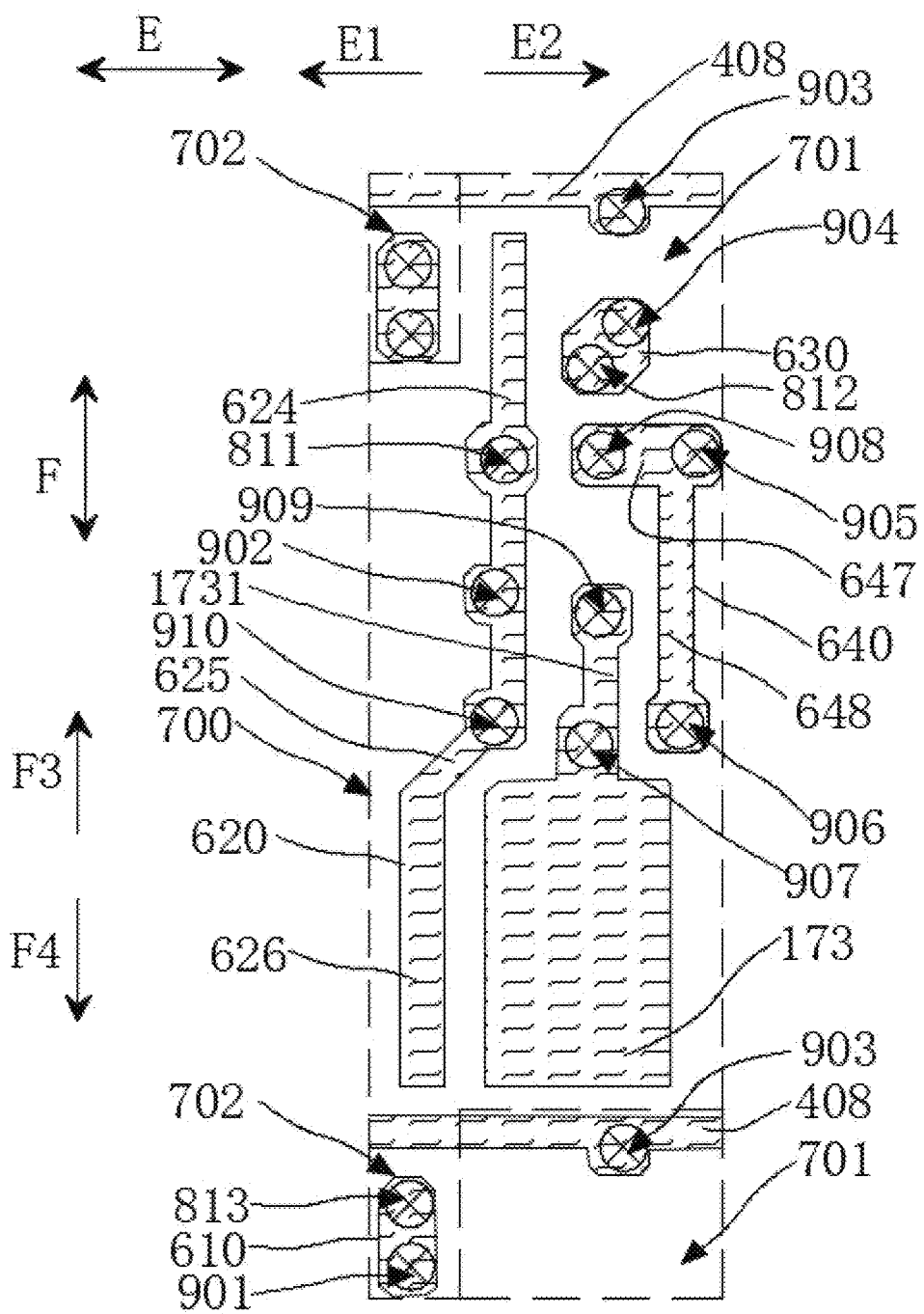
FIG. 14 is a schematic structural diagram of a first metal wiring layer in a pixel circuit region in an embodiment of the disclosure.
Figure 15:
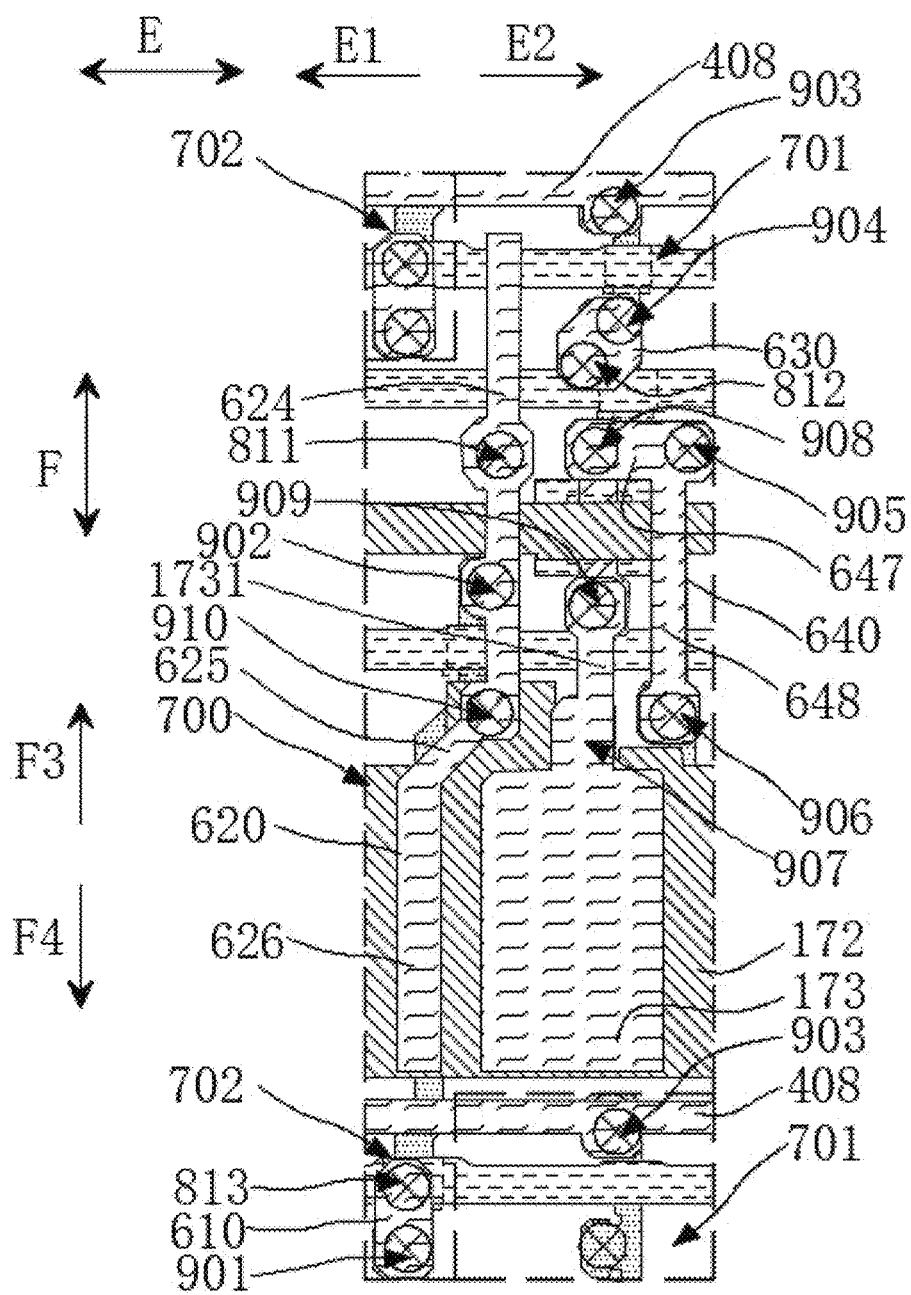
FIG. 15 is a schematic structural diagram of a polysilicon semiconductor layer, a first gate layer, a metal oxide semiconductor layer, a second gate layer, and a first metal wiring layer in a pixel circuit region in an embodiment of the disclosure.

Optionally, referring to FIGS. 8 and 11, in the same pixel circuit region 700, the first electrode plate 171 has a first protrusion 1711 extending toward a side close to the drain of the threshold compensation transistor 130. Referring to FIGS. 14 and 15, the third electrode plate 173 has a second protrusion 1731 extending toward the side close to the drain of the threshold compensation transistor 130. The first protrusion 1711 and the second protrusion 1731 are connected through a via hole. In this way, the electrical connection between the first electrode plate 171 and the third electrode plate 173 can be ensured. The second protrusion 1731 extends toward the side close to the drain of the threshold compensation transistor 130, which not only facilitates the electrical connection with the first protrusion 1711, but also facilitates the electrical connection with the drain of the threshold compensation transistor 130.

Further optionally, the second protrusion 1731 extends to a side of the drain of the threshold compensation transistor 130 away from the base substrate 201, and is electrically connected to the drain of the threshold compensation transistor 130 through a via hole.

Figure 17:
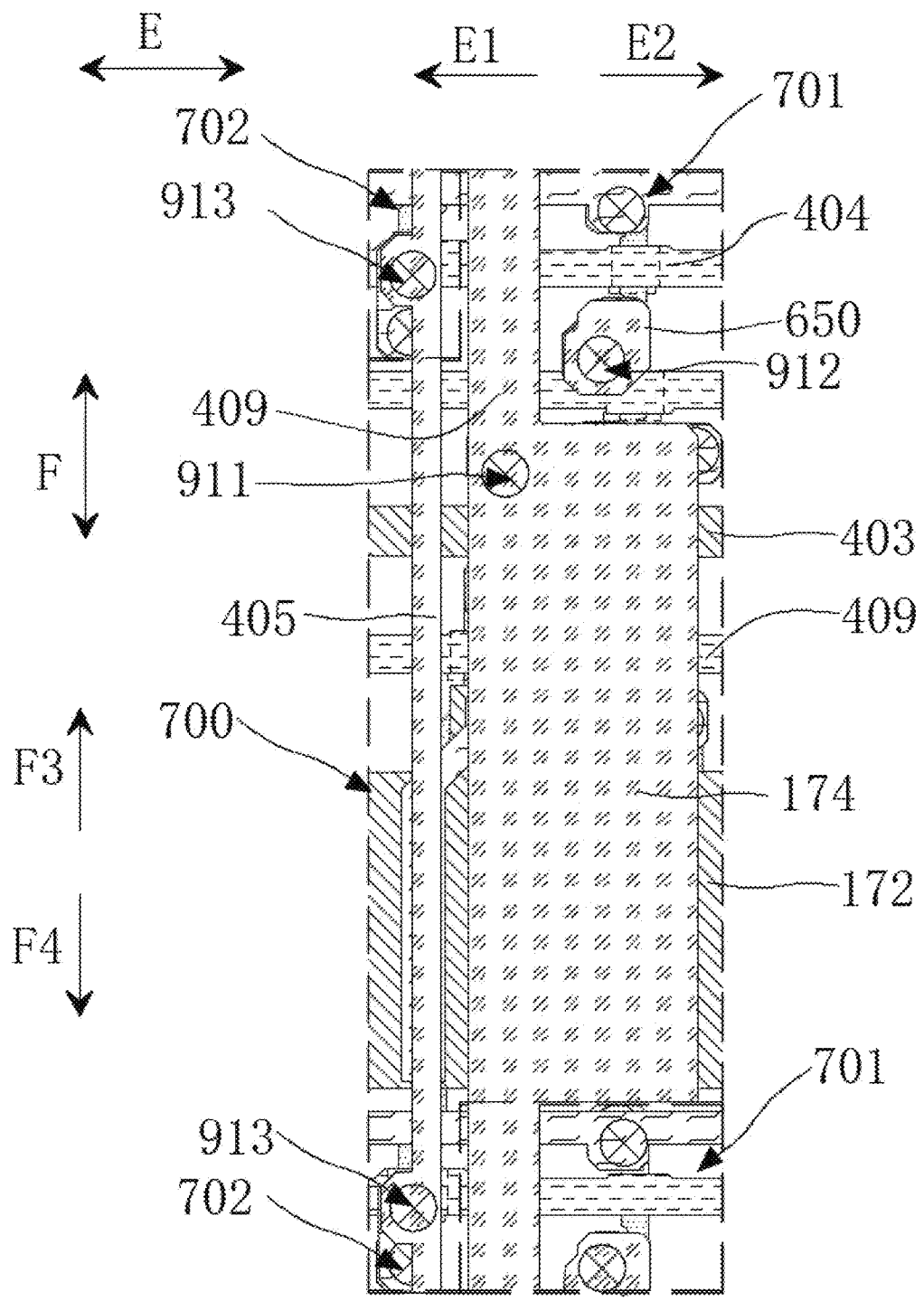
FIG. 17 shows a schematic structural diagram of a polysilicon semiconductor layer, a first gate layer, a metal oxide semiconductor layer, a second gate layer, a first metal wiring layer, and a second metal wiring layer in a pixel circuit region in an embodiment of the disclosure.

Optionally, referring to FIGS. 17 and 19, the orthographic projection of the active region of the threshold compensation transistor 130 on the base substrate 201 is located within the orthographic projection of the fourth electrode plate 174 on the base substrate 201. In other words, the fourth electrode plate 174 may cover the side of the threshold compensation transistor 130 away from the base substrate 201. In this way, the fourth electrode plate 174 can block the light from the side away from the base substrate 201, prevent the light from irradiating the active region of the threshold compensation transistor 130 to result in change of the semiconductor characteristics, and overcome the defect that the metal oxide transistor is susceptible to changes in the external environment.

In some embodiments, referring to FIG. 6, along the column direction F, one end of any pixel circuit region 700 has a first protruding region 701, and the other end has a second protruding region 702. Referring to FIG. 7, one of the reset transistor 160 (the channel region of the reset transistor 160 is 162) and the data writing transistor 120 (the channel region of the data writing transistor 120 is 122) is located in the first protruding region 701, and the other is located in the second protruding region 702.

Referring to FIG. 6, the display panel includes a plurality of pixel circuit regions 700 arranged in the same column. In the two adjacent pixel circuit regions 700 in the same column, the first protruding region 701 of the pixel circuit region 700 in the previous row and the the second protruding region 702 of the pixel circuit region 700 in the next row are adjacent and complementary.

Referring to FIG. 8 and FIG. 9, in the adjacent and complementary first protruding region 701 and second protruding region 702, the fourth scan lead 404 connected to the gate 121 of the data writing transistor and the reset control lead 407 connected to the gate 161 of the reset transistor are the same lead.

In the present disclosure, the first direction E1 to the fourth direction F4 may be defined within a plane parallel to the base substrate 201. The first direction E1 and the second direction E2 are two opposite directions along the row direction E. The third direction F3 and the fourth direction F4 are two opposite directions along the column direction F. In one pixel circuit region 700, the orthographic projection of the data writing transistor 120 in the row direction E is located on the side of the first direction E1 of the orthographic projection of the reset transistor 160 in the row direction E. That is, the orthographic projection of the reset transistor 160 in the row direction E is located on the side of the second direction E2 of the orthographic projection of the data writing transistor 120 in the row direction E. In one pixel circuit region 700, the orthographic projection of the data writing transistor 120 in the column direction F is located on the side of the fourth direction F4 of the orthographic projection of the reset transistor 160 in the column direction F. That is, the orthographic projection of the reset transistor 160 in the column direction F is located on the side of the third direction F3 of the orthographic projection of the data writing transistor 120 in the column direction F.

For example, one end of any pixel circuit region 700 in the third direction F3 has a first protruding region 701, and one end of any pixel circuit region 700 in the fourth direction F4 has a second protruding region 702. The reset transistor 160 is located in the first protruding region 701, and the data writing transistor 120 is located in the second protruding region 702. The adjacent edges of the orthographic projections of the first protruding region 701 and the second protruding region 702 in the row direction E overlap, and other edges do not overlap. In this way, in the two adjacent pixel circuit regions 700 along the column direction F, the second protruding region 702 of the pixel circuit region 700 in the previous row and the first protruding region 701 of the pixel circuit region 700 in the next row are adjacent and complementary. Furthermore, in any pixel circuit region 700, along the row direction E, the second protruding region 702 is located on the side of the second direction E2 of the first protruding region 701.

The fourth scan lead 404 corresponding to the pixel circuit region 700 in the previous row and the reset control lead 407 corresponding to the pixel circuit region 700 in the next row are the same lead. The fourth scan lead 404 corresponding to the pixel circuit region 700 of the previous row is the fourth scan lead 404 electrically connected to the gate of the data writing transistor in the pixel circuit region 700 of the previous row. The fourth scan lead 404 penetrates through the second protruding region 702 of the pixel circuit region 700 of the previous row and the first protruding region 701 of the pixel circuit region 700 of the next row along the row direction E. The reset control lead 407 corresponding to the pixel circuit region 700 of the next row is the reset control lead 407 electrically connected to the gate 161 of the reset transistor in the pixel circuit region 700 of the next row. The reset control lead 407 penetrates through the second protruding region 702 of the pixel circuit region 700 of the previous row and the first protruding region 701 of the pixel circuit region 700 of the next row along the row direction E. The reset control lead 407 and the fourth scan lead 404 penetrating the adjacent and complementary second protruding region 702 and the first protruding region 701 are the same lead.

In some embodiments, referring to FIG. 7, in one pixel circuit region 700, the connection lead includes the first connection lead 510 to the seventh connection lead 570. The first connection lead 510 is connected to the source of the second control transistor 150. The second connection lead 520 is connected to the drain of the second control transistor 150, the drain of the data writing transistor 120 and the source of the drive transistor 110. The third connection lead 530 is connected to the source of the data writing transistor 120. The fourth connection lead 540 is connected to the drain of the drive transistor 110. The fifth connection lead 550 is connected to the source of the first control transistor 140. The sixth connection lead 560 is connected to the drain of the first control transistor 140 and the drain of the reset transistor 160. The seventh connection lead 570 is connected to the source of the reset transistor 160.

Optionally, referring to FIG. 9, in one pixel circuit region 700, the orthographic projection of the first connection lead 510 on the base substrate 201 is located between the orthographic projections of the second scan lead 402 and the light-emitting signal lead 409 on the base substrate 201, and extends along the column direction F. Further, one end of the first connection lead 510 away from the source of the second control transistor 150 is provided with a second active via region 802. The second active via region 802 is used for electrical connection with the metal wiring layer 390 through a via hole. Preferably, the first connection lead 510 is located at a side of the third direction F3 of the source of the second control transistor 150.

Optionally, referring to FIG. 9, in one pixel circuit region 700, the orthographic projection of the second connection lead 520 on the base substrate 201 is located between the orthographic projections of the fourth scan lead 404 and the light-emitting signal lead 409 on the base substrate 201, and extends along the column direction F in a zigzag manner. Further, in one pixel circuit region 700, in the row direction E, the data writing transistor 120 is located at the first direction E1 side of the second control transistor 150. In the column direction F, the data writing transistor 120 is located in the fourth direction F4 side of the second control transistor 150. The second connection lead 520 includes a first conductive segment 521, a second conductive segment 522 and a third conductive segment 523. The first conductive segment 521 is connected to the drain of the second control transistor 150 and the second conductive segment 522, and extends in an oblique direction. In the present disclosure, the inclination direction is a direction that is not parallel to both the row direction E and the column direction F. The inclination direction may be, for example, a direction that forms an angle of 30°-60° with the row direction E. The second conductive segment 522 is electrically connected to the first conductive segment 521 and the third conductive segment 523 and extends along the column direction F. The third conductive segment 523 is connected to the drain of the data writing transistor 120. The orthographic projections of the first conductive segment 521, the second conductive segment 522 and the third conductive segment 523 on the row direction E are sequentially arranged along the first direction E1.

Optionally, referring to FIG. 9, in one pixel circuit region 700, the orthographic projection of the third connection lead 530 on the base substrate 201 is located at the fourth direction F4 side of the fourth scan lead 404, and is connected with the source of the data writing transistor 120. Further, the third connection lead 530 has a first active via region 801, and the first active via region 801 is used for electrical connection with the metal wiring layer 390 through a via hole.

Optionally, referring to FIG. 7, in one pixel circuit region 700, the channel region 112 of the drive transistor is arranged in a zigzag manner, and is arranged on the side of the second direction E2 of the second conductive segment 522. Further, the orthographic projection of the channel region 112 of the drive transistor in the column direction F is located within the orthographic projection of the second conductive segment 522 in the column direction F.

Optionally, referring to FIG. 9, in one pixel circuit region 700, the fourth connection lead 540 is located at the side of the third direction F3 of the channel region 112 of the drive transistor, and is electrically connected to the drain of the drive transistor 110. The fourth connection lead 540 has a sixth active via region 806, and the sixth active via region 806 is used for electrical connection with the metal wiring layer 390 through a via hole.

Optionally, referring to FIG. 7 and FIG. 9, in one pixel circuit region 700, the fifth connection lead 550 is located at the side of the third direction F3 of the channel region 112 of the drive transistor, is electrically connected to the source of the first control transistor 140, and is located at the side of the fourth direction F4 of the channel region 142 of the first control transistor. The fifth connection lead 550 has a fifth active via region 805, and the fifth active via region 805 is used for electrical connection with the metal wiring layer 390 through a via hole. Further, the fifth active via region 805 and the sixth active via region 806 are located on a straight line along the column direction F.

Optionally, referring to FIG. 7 and FIG. 9, in one pixel circuit region 700, the sixth connection lead 560 is located at the side of the third direction F3 of the channel region 142 of the first control transistor, and is electrically connected with the drain of the first control transistor 140 and the drain of the reset transistor 160. Further, the sixth connection lead 560 is located between the channel region 142 of the first control transistor and the channel region 162 of the reset transistor. The sixth connection lead 560 has a fourth active via region 804, and the fourth active via region 804 is used for electrically connection with the metal wiring layer 390 through a via hole.

Optionally, referring to FIGS. 7 and 9, in one pixel circuit region 700, the seventh connection lead 570 is located at the side of the third direction F3 of the channel region 162 of the reset transistor, and is electrically connected to the source of the reset transistor 160. Further, the seventh connection lead 570 has a third active via region 803, and the third active via region 803 is used for electrical connection with the metal wiring layer 390 through a via hole.

Optionally, referring to FIGS. 7 and 9, in one pixel circuit region 700, the channel region 162 of the reset transistor and the channel region 142 of the first control transistor are located on the same straight line along the column direction F.

In some embodiments, referring to FIGS. 8 and 9, the first gate layer 330 includes a reset control lead 407, a first scan lead 401, a second scan lead 402, a light-emitting signal lead 409, a first electrode plate 171 of the storage capacitor 17 and a fourth scan lead 404. Referring to FIGS. 8 and 9, in one pixel circuit region 700, the reset control lead 407, the first scan lead 401, the second scan lead 402, the light-emitting signal lead 409, the first electrode plate 171 of the storage capacitor 17 and the fourth scan lead 404 are arranged in sequence along the fourth direction F4.

Optionally, referring to FIGS. 8 and 9, the reset control lead 407 extends in the row direction E. The orthographic projection of the gate 161 of the reset transistor on the first electrode layer is located within the reset control lead 407, and the gate 161 of the reset transistor is multiplexed as a part of the reset control lead 407.

Optionally, referring to FIGS. 8 and 9, the first scan lead 401 extends along the row direction E. The orthographic projection of the gate 141 of the first control transistor on the first electrode layer is located in the first scan lead 401, and the gate 141 of the first control transistor is multiplexed as a part of the first scan lead 401.

Optionally, referring to FIGS. 8 and 9, the second scan lead 402 extends along the row direction E. The orthographic projection of the first gate 1311 of the threshold compensation transistor 130 on the first electrode layer is located in the second scan lead 402, and the first gate 1311 of the threshold compensation transistor 130 is multiplexed as a part of the second scan lead 402. Further, in one pixel circuit region 700, the width of the second scan lead 402 can be locally increased, and the orthographic projection of the first gate 1311 of the threshold compensation transistor 130 on the first gate layer 330 is completely located in the locally enlarged portion of the second scan lead 402. In this way, the locally enlarged portion of the second scan lead 402 can completely block the channel region 132 of the threshold compensation transistor on the side close to the base substrate 201, which facilitates holding the characteristics of the threshold compensation transistor 130.

Optionally, referring to FIGS. 8 and 9, the light-emitting signal lead 409 extends along the row direction E. The orthographic projection of the gate 151 of the second control transistor on the first electrode layer is located in the light-emitting signal lead 409, and the gate 151 of the second control transistor is multiplexed as a part of the light-emitting signal lead 409.

Optionally, referring to FIGS. 8 and 9, the first electrode plate 171 of the storage capacitor 17 covers the active region of the drive transistor 110, so as to be multiplexed as the gate of the transistor. Further, referring to FIGS. 8 and 9, the first electrode plate 171 includes a first protrusion 1711 extending toward the side of the drain of the threshold compensation transistor 130, and the first protrusion 1711 may be provided with a seventh gate via region 807. The seventh gate via region 807 is used to electrically connect with the metal wiring layer 390 through a via hole.

Optionally, referring to FIGS. 8 and 9, the fourth scan lead 404 extends along the row direction E. The orthographic projection of the gate 121 of the data writing transistor on the first gate layer is located in the fourth scan lead 404, and the gate 121 of the data writing transistor is multiplexed as a part of the fourth scan lead 404. Further, the fourth scan lead 404 of the pixel circuit region 700 of the previous row is multiplexed as the reset control lead 407 of the pixel circuit region 700 of the next row.

Referring to FIGS. 10 and 11, the metal oxide semiconductor layer 350 includes the active region of the threshold compensation transistor 130, that is, includes the source, drain and channel region 132 of the threshold compensation transistor 130. In some embodiments, in any pixel circuit region 700, the active region of the threshold compensation transistor 130 extends along the column direction F and is located between the first scan lead 401 and the light-emitting signal lead 409. The source, the channel region 132 and the drain of the threshold compensation transistor 130 are arranged in sequence along the fourth direction F4.

In some embodiments, referring to FIGS. 12 and 13, in any one pixel circuit region 700, the second gate layer 370 includes the third scan lead 403 and the second electrode plate 172 of the storage capacitor 17.

Optionally, referring to FIGS. 12 and 13, the second gate 1312 of the threshold compensation transistor 130 is a part of the third scan lead 403. That is, the third scan lead 403 may penetrate the pixel circuit region 700 along the row direction E, and cover the channel region 132 of the threshold compensation transistor to form the second gate 1312 of the threshold compensation transistor 130.

Optionally, referring to FIGS. 12 and 13, the second electrode plate 172 covers at least part of the first electrode plate 171, so as to be coupled with the first electrode plate 171. Further, the second electrode plate 172 exposes the first protrusion 1711 of the first electrode plate 171 and covers other parts of the first electrode plate 171, to maximize the coupling area between the first electrode plate 171 and the second electrode plate 172, and ensure the connection between the first electrode plate 171 and the metal wiring layer 390.

Optionally, referring to FIGS. 12 and 13, the second electrode plate 172 may further include a third protrusion 1721 extending toward a side close to the second control transistor 150. The third protrusion 1721 is provided with a tenth gate via region 810, and the tenth gate via region 810 is used to electrically connect with the metal wiring layer 390 through the via hole. Further, the third protrusion 1721 covers at least part of the first conductive segment 521, to ensure the stability of the voltage on the first conductive segment 521.

Optionally, referring to FIGS. 12 and 13, the second electrode plate 172 also extends along the row direction E, to cover at least part of the second connection lead 520, especially cover at least part of the second conductive segment 522. In this way, the second electrode plate 172 can avoid the crosstalk of the signal of the metal wiring layer 390 on the signal of the source side of the drive transistor 110, and especially can reduce the interference of the data voltage lead 405 on the second connection lead 520.

Further, referring to FIG. 12 and FIG. 13, the second electrode plate 172 also extends along the row direction E, so that the second electrode plates 172 of the two adjacent pixel circuit regions 700 in the same row are connected as a whole.

Figure 16:
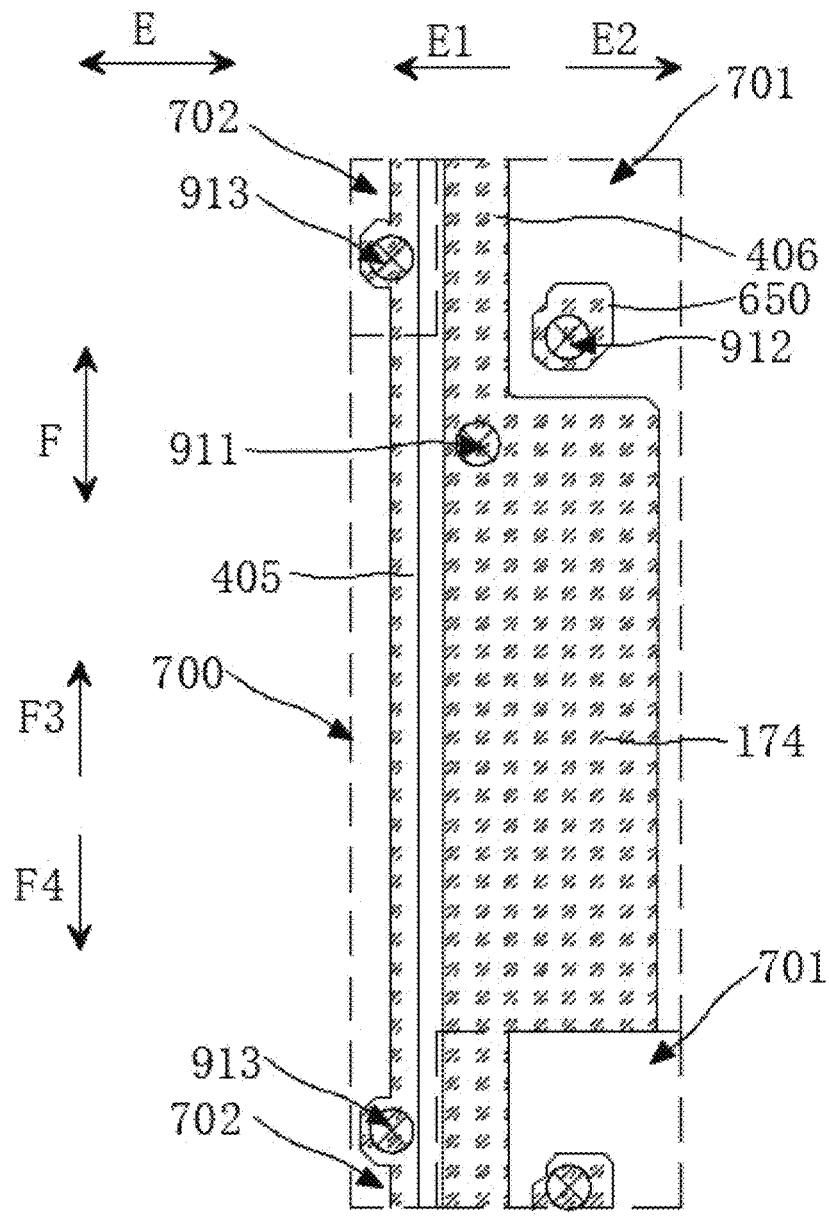
FIG. 16 is a schematic structural diagram of a second metal wiring layer in a pixel circuit region in an embodiment of the disclosure.

In some embodiments, referring to FIGS. 14, 16 and 19, the metal wiring layer 390 includes a first metal wiring layer 391 and a second metal wiring layer 393 located on the side of the first metal wiring layer 391 away from the base substrate 201. The first electrode of the storage capacitor 17 includes a first electrode plate 171 located in the first gate layer 330 and a third electrode plate 173 located in the first metal wiring layer 391, which are electrically connected to each other. The second electrode of the storage capacitor 17 includes a second electrode plate 172 located in the second gate layer 370 and a fourth electrode plate 174 located in the second metal wiring layer 393, which are electrically connected to each other. The orthographic projections of the first electrode plate 171, the second electrode plate 172, the third electrode plate 173 and the fourth electrode plate 174 on the base substrate 201 have a common overlapping region.

Referring to FIGS. 14 and 15, the metal wiring includes the first metal wiring 610 to the fourth metal wiring 640 located in the first metal wiring layer 391. The first metal wiring 610 is electrically connected to the third connection lead 530. The second metal wiring 620 is connected to the first connection lead 510, the first power supply voltage lead 406. The third metal wiring 630 is connected to the sixth connection lead 560. The fourth metal wiring 640 is electrically connected to the fifth connection lead 550, the source of the threshold compensation transistor 130 and the drain of the drive transistor 110. The third electrode plate 173 is electrically connected to the first electrode plate 171 and the drain of the threshold compensation transistor 130.

Referring to FIGS. 16 and 17, the metal wiring further includes a fifth metal wiring 650 located in the second metal wiring layer 393, and the fifth metal wiring 650 is electrically connected to the third metal wiring 630.

Referring to FIGS. 14 to 17, the initialization signal lead 408 is located in the first metal wiring layer 391, and the data voltage lead 405 and the first power supply voltage lead 406 are located in the second metal wiring layer 393. The initialization signal lead 408 is electrically connected to the seventh connection lead 570. The data voltage lead 405 is electrically connected to the first metal wiring 610. The first power supply voltage lead 406 is electrically connected to the fourth electrode plate 174 and the second metal wiring 620.

Optionally, referring to FIGS. 14 and 15, the first metal wiring layer 391 includes the third electrode plate 173 of the storage capacitor 17, and the third electrode plate 173 at least partially overlaps with the second electrode plate 172. The third electrode plate 173 has a second protrusion 1731 extending toward the side close to the drain of the threshold compensation transistor 130. The second protrusion 1731 may be provided with a seventh wiring via region 907 and a ninth wiring via region 909. The seventh wiring via region 907 is connected to the seventh gate via region 807 through a via hole, so that the third electrode plate 173 and the first electrode plate 171 are electrically connected. The seventh wiring via region 907 is electrically connected to the drain of the threshold compensation transistor 130 through the via hole, so that the first electrode of the storage capacitor 17 is electrically connected to the drain of the threshold compensation transistor 130.

Optionally, referring to FIG. 14 and FIG. 15, the initialization signal lead 408 passes through the pixel circuit region 700 along the row direction E and may be provided with a third wiring via region 903. The third wiring via region 903 is electrically connected to the third active via region 803 through the via hole. In this way, the initialization signal lead 408 corresponding to any pixel circuit region 700 penetrates the first protruding region 701 of the pixel circuit region 700 along the row direction E, and is electrically connected to the source of the reset transistor 160 in the pixel circuit region 700. In the pixel circuit regions 700 of two adjacent rows, the initialization signal lead 408 passes through the second protruding region 702 of the pixel circuit region 700 of the previous row and the first protruding region 701 of the pixel circuit region 700 of the next row.

Optionally, referring to FIG. 14 and FIG. 15, the first metal wiring 610 is located in the second protruding region 702 of the pixel circuit region 700 and is provided with a first wiring via region 901 and a thirteenth bottom via region 813. The first wiring via region 901 is used to electrically connect to the first active via region 801 through a via hole, and the thirteenth bottom via region 813 is used to electrically connect to the data voltage lead 405 through a via hole. Further, the thirteenth bottom via region 813 at least partially overlaps with the channel region 122 of the data writing transistor.

Optionally, referring to FIGS. 14 and 15, the second metal wiring 620 includes a fourth conductive segment 624, a fifth conductive segment 625 and a sixth conductive segment 626 that are electrically connected in sequence. The fourth conductive segment 624 extends along the column direction F, and is located at the side of the second direction E2 of the first metal wiring 610 in the row direction E. Along the fourth direction F4, the fourth conductive segment 624 is sequentially provided with an eleventh bottom via region 811, a second wiring via region 902 and a tenth wiring via region 910. The eleventh bottom via region 811 is used to connect with the first power supply voltage lead 406 through a via hole. The second wiring via region 902 is used to connect with the second active via region 802 through a via hole. The tenth wiring via region 910 is used to connect with the tenth active via region through a via hole. The sixth conductive segment 626 extends along the column direction F and at least partially covers the second conductive segment 522, to further reduce the interference of the data voltage lead 405 on the source of the drive transistor 110.

Optionally, referring to FIGS. 14 and 15, the third metal wiring 630 is located between the initialization signal lead 408 and the fourth metal wiring 640, and is located at the side of the second direction E2 of the second metal wiring 620. The third metal wiring 630 has a fourth wiring via region 904 and a twelfth bottom via region 812. The fourth wiring via region 904 is connected to the fourth active via region 804 through a via hole. The twelfth bottom via region 812 is connected to the fifth metal wiring 650 through a via hole.

Optionally, referring to FIGS. 14 and 15, the fourth metal wiring 640 includes a seventh conductive segment 647 and an eighth conductive segment 648 that are connected to each other. The seventh conductive segment 647 extends along the row direction E and is located between the third metal wiring 630 and the third electrode plate 173, and has a fifth wiring via region 905 and an eighth wiring via region 908. The fifth wiring via region 905 is connected to the fifth active via region 805 through a via hole. The eighth wiring via region 908 is connected to the source of the threshold compensation transistor 130 via a via hole. The eighth conductive segment 648 extends along the column direction F and is located at the side of the second direction E2 of the second protrusion 1731. One end of the eighth conductive segment 648 in the fourth direction F4 has a sixth wiring via region 906. The sixth wiring via region 906 is connected to the sixth active via region 806 through a via hole.

Optionally, referring to FIGS. 16 and 17, both the data voltage lead 405 and the first power supply voltage lead 406 are located in the second metal wiring layer 393 and extend in the column direction F. Further, in the same pixel circuit region 700, the data voltage lead 405 is located at a side of the first direction E1 of the first power voltage lead 406.

The data voltage lead 405 has a thirteenth top via region 913. The thirteenth top via region 913 is used to connect to the thirteenth bottom via region 813 through a via hole. In this way, the data voltage $V_{data}$ applied to the data voltage lead 405 can be applied to the source of the data writing transistor 120 through the first metal wiring 610.

The first power supply voltage lead 406 has an eleventh top via region 911. The eleventh top via region 911 is used to connect to the eleventh bottom via region 811 through a via hole. In this way, the first power supply voltage VDD applied to the first power supply voltage lead 406 can be applied to the second electrode plate 172 of the storage capacitor 17 and the source of the second control transistor 150 through the second metal wiring 620.

The fourth electrode plate 174 is disposed in the second metal wiring layer 393 and is electrically connected to the first power supply voltage lead 406. Optionally, referring to FIG. 16 and FIG. 17, the fourth electrode plate 174 is located at the side of the second direction E2 of the first power supply voltage lead 406. The side of the fourth electrode plate 174 at the side of the first direction E1 may overlap with a part of the edge of the first power supply voltage lead 406, so that the fourth electrode plate 174 is equivalent to extension of the first power supply voltage lead 406 toward the second direction E2 side. Further, referring to FIGS. 16 and 17, the fourth electrode plate 174 may partially cover the channel region 112 of the drive transistor, and completely cover the channel region 132 of the threshold compensation transistor.

Referring to FIGS. 16 and 17, the fifth metal wiring 650 is located in the second metal wiring layer 393 and is provided with a twelfth top via region 912. The twelfth top via region 912 is used to connect to the twelfth bottom via region 812 through a via hole, so that the fifth metal wiring 650 is connected to the drain of the first control transistor 140 through the third metal wiring 630. The fifth metal wiring 650 is used to electrically connect with the light-emitting element 18 corresponding to the pixel circuit region 700, especially used to connect with the pixel electrode of the light-emitting element 18 through a via hole.

Those skilled in the art will easily think of other embodiments of the present disclosure after considering the specification and practicing the disclosure disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are only regarded as exemplary, and the true scope and spirit of the present disclosure are indicated by the appended claims.

What is claimed is:

1. A pixel drive circuit, comprising:
   a drive transistor, having a source connected to a first node, a drain connected to a second node, and a gate connected to a third node, wherein the gate of the drive transistor is located in a first gate layer;
   a storage capacitor, having a first end connected to the third node, and a second end configured to apply a first power supply voltage or a second power supply voltage;
   a first control unit, connected to the second node and a fourth node, and configured to enable a path between the second node and the fourth node in response to a first control signal;
   a second control unit, connected to the first node, and configured to output the first power supply voltage to the first node in response to a light-emitting signal;
   a threshold compensation transistor, connected to the second node and the third node, and configured to enable a path between the second node and the third node in response to a second control signal, wherein a material of an active region of the threshold compensation transistor is a metal oxide semiconductor, wherein only one leakage path of the threshold compensation transistor exists at the third node;
   a data writing unit, connected to the first node, and configured to output a data voltage to the first node in response to a third control signal;
   a reset unit, connected to the fourth node, and configured to output an initialization voltage to the fourth node in response to a reset control signal; and
   a light-emitting element, having a first end connected to the fourth node, and a second end configured to apply the second power supply voltage,
   wherein the reset unit is one reset transistor, the reset transistor has a source configured to apply the initialization voltage, a drain connected to the fourth node, and a gate configured to apply the reset control signal,
   wherein a gate of the threshold compensation transistor comprises a first gate located in the first gate layer and a second gate located in a second gate layer, and a channel region of the threshold compensation transistor is sandwiched between the first gate and the second gate, and the first gate and the second gate are configured to apply the second control signal simultaneously, wherein an orthographic projection of the channel region of the threshold compensation transistor on the first gate layer is completely located in the first gate.

2. The pixel drive circuit according to claim 1, wherein the data writing unit comprises a data writing transistor, the data writing transistor has a source configured to apply the data voltage, a drain connected to the first node, and a gate configured to apply the third control signal;
   the first control unit comprises a first control transistor, the first control transistor has a source connected to the second node, a drain connected to the fourth node, and a gate configured to apply the first control signal;
   the second control unit comprises a second control transistor, the second control transistor has a source configured to apply the first power supply voltage, a drain connected to the first node, and a gate configured to apply the light-emitting signal.

3. The pixel drive circuit according to claim 2, wherein the drive transistor, the data writing transistor, the first control transistor, the second control transistor and the reset transistor are all P-type transistors, and active regions are all polysilicon; the threshold compensation transistor is an N-type transistor.

4. The pixel drive circuit according to claim 1, wherein the storage capacitor comprises a first electrode plate, a second electrode plate, a third electrode plate and a fourth electrode plate that are stacked in sequence, and an insulating medium is sandwiched between any two adjacent electrode plates; the first electrode plate and the third electrode plate are both electrically connected to the third node; the second electrode plate and the fourth electrode plate are connected to each other and are configured to apply the first power supply voltage or the second power supply voltage.

5. A method for driving a pixel drive circuit, the pixel drive circuit comprising: a drive transistor, having a source connected to a first node, a drain connected to a second node, and a gate connected to a third node, wherein the gate of the drive transistor is located in a first gate layer; a storage capacitor, having a first end connected to the third node, and a second end configured to apply a first power supply voltage or a second power supply voltage; a first control unit, connected to the second node and a fourth node, and configured to enable a path between the second node and the fourth node in response to a first control signal; a second control unit, connected to the first node, and configured to output the first power supply voltage to the first node in response to a light-emitting signal; a threshold compensation transistor, connected to the second node and the third node, and configured to enable a path between the second node and the third node in response to a second control signal, wherein a material of an active region of the threshold compensation transistor is a metal oxide semiconductor, wherein only one leakage path of the threshold compensation transistor exists at the third node; a data writing unit, connected to the first node, and configured to output a data voltage to the first node in response to a third control signal; a reset unit, connected to the fourth node, and configured to output an initialization voltage to the fourth node in response to a reset control signal; and a light-emitting element, having a first end connected to the fourth node, and a second end configured to apply the second power supply voltage, wherein the reset unit is one reset transistor, the reset transistor has a source configured to apply the initialization voltage, a drain connected to the fourth node, and a gate configured to apply the reset control signal, wherein a gate of the threshold compensation transistor comprises a first gate located in the first gate layer and a second gate located in a second gate layer, and a channel region of the threshold compensation transistor is sandwiched between the first gate and the second gate, and the first gate and the second gate are configured to apply the second control signal simultaneously, wherein an orthographic projection of the channel region of the threshold compensation transistor on the first gate layer is completely located in the first gate, wherein the method for driving the pixel drive circuit comprises:

in a reset stage, applying the reset control signal to the reset unit to enable the reset unit to output the initialization voltage to the fourth node, applying the first control signal to the first control unit to enable a path between the second node and the fourth node, applying a second control signal to the threshold compensation transistor to enable a path between the second node and the third node, wherein the drive transistor is turned on under control of the initialization voltage applied to the third node;

in a data writing stage, applying the third control signal and the data voltage to the data writing unit to output the data voltage to the first node, applying the second control signal to the threshold compensation transistor to enable a path between the second node and the third node, wherein the drive transistor is turned off after the third node is written with the data voltage compensated by a threshold voltage of the drive transistor; and in a light-emitting stage, applying the light-emitting signal to the second control unit to apply the first power supply voltage to the first node, and applying the first control signal to the first control unit to enable a path between the second node and the fourth node.

6. A display panel, comprising a pixel drive circuit, wherein the pixel drive circuit comprises: a drive transistor, having a source connected to a first node, a drain connected to a second node, and a gate connected to a third node, wherein the gate of the drive transistor is located in a first gate layer; a storage capacitor, having a first end connected to the third node, and a second end configured to apply a first power supply voltage or a second power supply voltage; a first control unit, connected to the second node and a fourth node, and configured to enable a path between the second node and the fourth node in response to a first control signal; a second control unit, connected to the first node, and configured to output the first power supply voltage to the first node in response to a light-emitting signal; a threshold compensation transistor, connected to the second node and the third node, and configured to enable a path between the second node and the third node in response to a second control signal, wherein a material of an active region of the threshold compensation transistor is a metal oxide semiconductor, wherein only one leakage path of the threshold compensation transistor exists at the third node; a data writing unit, connected to the first node, and configured to output a data voltage to the first node in response to a third control signal; a reset unit, connected to the fourth node, and configured to output an initialization voltage to the fourth node in response to a reset control signal; and a light-emitting element, having a first end connected to the fourth node, and a second end configured to apply the second power supply voltage, wherein the reset unit is one reset transistor, the reset transistor has a source configured to apply the initialization voltage, a drain connected to the fourth node, and a gate configured to apply the reset control signal, wherein a gate of the threshold compensation transistor comprises a first gate located in the first gate layer and a second gate located in the first gate layer, and a channel region of the threshold compensation transistor is sandwiched between the first gate and the second gate, and the first gate and the second gate are configured to apply the second control signal simultaneously, wherein an orthographic projection of the channel region of the threshold compensation transistor on the first gate layer is completely located in the first gate.

7. The display panel according to claim 6, wherein the display panel comprises a plurality of rows of the pixel drive circuits;

when the data writing unit comprises a data writing transistor and the reset unit comprises a reset transistor, in two adjacent rows of the pixel drive circuits, gates of the data writing transistors of the pixel drive circuits of a previous row are electrically connected with gates of the reset transistors of the pixel drive circuits of a next row.

8. The display panel according to claim 7, wherein the display panel further comprises a plurality of reset control leads in one-to-one correspondence with the plurality of rows of the pixel drive circuits; in the two adjacent rows of the pixel drive circuits, the gates of the data writing transistors of the pixel drive circuits of a previous row and the gates of the reset transistors of the pixel drive circuits of a next row are connected to an identical reset control lead.

9. The display panel according to claim 6, wherein the display panel comprises a plurality of rows of the pixel drive circuits;

when the first control unit comprises a first control transistor, in two adjacent rows of the pixel drive circuits, gates of the first control transistors of the pixel drive circuits of a previous row are electrically connected with gates of the threshold compensation transistors of the pixel drive circuits of a next row.

10. The display panel according to claim 9, wherein the display panel comprises a plurality of first scan leads and a plurality of second scan leads arranged in one-to-one correspondence with the plurality of rows of the pixel drive circuits; the gates of the first control transistors of the pixel drive circuits of any row are electrically connected with a corresponding first scan lead, and the gates of the threshold compensation transistors of the pixel drive circuits of any row are electrically connected with a corresponding second scan lead;

wherein, in two adjacent rows of the pixel drive circuits, the first scan lead corresponding to the pixel drive circuits of the previous row is electrically connected with the second scan lead corresponding to the pixel drive circuits of the next row.

11. The display panel according to claim 10, wherein when the gate of the threshold compensation transistor comprises a first gate and a second gate, the display panel further comprises a plurality of third scan leads arranged in one-to-one correspondence with the plurality of rows of the pixel drive circuits;

the first gates of the threshold compensation transistors of the pixel drive circuits of any row are electrically connected with the corresponding second scan lead, and the second gates of the threshold compensation transistors of the pixel drive circuits of any row are electrically connected with the corresponding third scan lead; the second scan lead and the third scan lead corresponding to the pixel drive circuits of any row are electrically connected.

12. The display panel according to claim 6, wherein the display panel comprises a base substrate, a drive circuit layer and a display device layer that are stacked in sequence; the drive circuit layer comprises a polysilicon semiconductor layer, a first gate insulating layer, the first gate layer, a first interlayer dielectric layer, a metal oxide semiconductor layer, a second gate insulating layer, a second gate layer, a second interlayer dielectric layer and a metal wiring layer that are stacked in sequence on the base substrate;

the first gate layer comprises a fourth scan lead, a reset control lead, a first scan lead, a second scan lead, a light-emitting signal lead, and a first electrode plate of the storage capacitor;

the first scan lead is configured to transmit the first control signal; the second scan lead is configured to transmit the second control signal; the fourth scan lead is configured to transmit the third control signal; the reset control lead is configured to transmit the reset control signal; and the light-emitting signal lead is configured to transmit the light-emitting signal; the second gate layer comprises a third scan lead configured to transmit the second control signal and a second electrode plate of the storage capacitor.

13. The display panel according to claim 12, wherein the metal wiring layer comprises a first metal wiring layer and a second metal wiring layer located on a side of the first metal wiring layer away from the base substrate;

a first electrode of the storage capacitor comprises a first electrode plate located in the first gate layer and a third electrode plate located in the first metal wiring layer that are electrically connected with each other, and a second electrode of the storage capacitor comprises a second electrode plate located in the second gate layer and a fourth electrode plate located in the second metal wiring layer that are electrically connected with each other;

orthographic projections of the first electrode plate, the second electrode plate, the third electrode plate and the fourth electrode plate on the base substrate have a common overlapping region.

14. The display panel according to claim 13, wherein the display panel comprises a plurality of pixel circuit regions arranged in an identical row; the two second electrode plates in the two adjacent pixel circuit regions arranged in an identical row are connected with each other.

15. The display panel according to claim 13, wherein, in an identical pixel circuit region, the first electrode plate has a first protrusion extending toward a side close to the drain of the threshold compensation transistor, the third electrode plate has a second protrusion extending toward the side close to the drain of the threshold compensation transistor; the first protrusion and the second protrusion are connected through a via hole.

16. The display panel according to claim 13, wherein an orthographic projection of an active region of the threshold compensation transistor on the base substrate is located within the orthographic projection of the fourth electrode plate on the base substrate.

17. The display panel according to claim 12, wherein the display panel comprises a plurality of first leads and a plurality of first shift registers cascaded in sequence; each of the first leads extends in a row direction and is connected to an output end of each of the first shift registers in one-to-one correspondence;

the number of the pixel drive circuits is multiple and the plurality of the pixel drive circuits are arranged in a plurality of rows; the pixel drive circuits of any two adjacent rows are electrically connected with an identical first lead, and any two adjacent first leads are electrically connected with the pixel drive circuits in an identical row;

wherein, in the pixel drive circuits of two adjacent rows, the first lead is used as the fourth scan lead to apply the third control signal to the pixel drive circuits of a previous row, and used as the reset control lead to apply the reset control signal to the pixel drive circuits of a next row.

18. The display panel according to claim 12, wherein the number of the pixel drive circuits is multiple and the plurality of the pixel drive circuits are arranged in plurality of rows; the number of the first scan lead is multiple and all the first scan leads extend along a row direction, and the plurality of the first scan leads are electrically connected with the plurality of rows of the pixel drive circuits in one-to-one correspondence; the number of the second scan lead is multiple and all the second scan leads extend along the row direction, and the plurality of the second scan leads are electrically connected with the plurality of rows of the pixel drive circuits in one-to-one correspondence; the number of the third scan lead is multiple and all the third scan leads extend along the row direction, and the plurality of the third scan leads are electrically connected with the plurality of rows of the pixel drive circuits in one-to-one correspondence;

the display panel further comprises a plurality of second shift registers cascaded in sequence;

wherein, in the pixel drive circuits of any two adjacent rows, the second scan lead and the third scan lead connected to the pixel drive circuits of the next row, and the first scan lead connected to the pixel driving circuits of the previous row are connected to an output end of an identical second shift register unit;

in the first scan lead, the second scan lead and the third scan lead connected to the pixel driving circuits of any row, the first scan lead and the second scan lead are respectively connected to output ends of two adjacent second shift register units, the second scan lead and the third scan lead are connected to the output end of an identical second shift register.

* * * * *